United States Patent [19]

Anderson et al.

[11] 4,372,414

[45] Feb. 8, 1983

[54] FUEL-EFFICIENT ENERGY STORAGE AUTOMOTIVE DRIVE SYSTEM

[75] Inventors: David H. Anderson, Portland; Eugene F. Lucas, Lake Oswego, both of Oreg.

[73] Assignee: Advanced Energy Systems, Inc., Portland, Oreg.

[21] Appl. No.: 184,149

[22] Filed: Sep. 4, 1980

[51] Int. Cl.$^3$ .............................................. B60K 9/000
[52] U.S. Cl. ...................................... 180/165; 60/418; 60/420; 73/510; 74/665 G; 74/687; 74/720.5; 74/730; 74/732
[58] Field of Search ............... 180/165, 54 R, 65 A, 180/65 R, 305, 306–308; 105/64 R, 65, 20 R, 358; 60/413, 414, 416, 418, 420, 421, 435, 437, 445, 448–450, 483, 404–412, 698, DIG. 2; 74/572, 675, 686, 687, 751, 720.5, 730, 665 R, 732, 665 G; 73/510, 521, 524, 488

[56] References Cited

U.S. PATENT DOCUMENTS

| | | |
|---|---|---|
| 2,874,591 | 2/1959 | Thoma ............................ 74/687 X |
| 3,169,595 | 2/1965 | Shepherd ....................... 74/720.5 X |
| 3,320,829 | 5/1967 | Cull ................................ 74/720.5 |
| 3,457,808 | 7/1969 | Eickmann ........................ 74/730 |
| 3,665,788 | 5/1972 | Nyman ............................. 74/751 |
| 3,672,161 | 6/1972 | Krusche et al. ................. 60/420 |
| 3,871,235 | 3/1975 | Anderson ......................... 73/510 |
| 3,892,283 | 7/1975 | Johnson .......................... 180/66 R |
| 3,903,696 | 9/1975 | Carman ............................ 60/414 |
| 3,952,513 | 4/1976 | Kubik .............................. 60/435 |
| 4,018,052 | 4/1977 | Laussermair ..................... 60/414 |
| 4,037,409 | 7/1977 | Leibach ........................... 60/413 |
| 4,065,975 | 1/1978 | Giessner .......................... 73/510 |
| 4,098,083 | 7/1978 | Carman ............................ 60/414 |
| 4,098,144 | 7/1978 | Besel et al. .................... 74/687 |
| 4,110,982 | 9/1978 | Regar .............................. 60/413 |
| 4,215,545 | 8/1980 | Morello ............................ 60/413 |
| 4,227,587 | 10/1980 | Carman ........................... 180/165 |
| 4,305,254 | 12/1981 | Kawakatsu et al. ........... 180/65 A X |

FOREIGN PATENT DOCUMENTS

| | | |
|---|---|---|
| 1816183 | 6/1970 | Fed. Rep. of Germany ..... 74/720.5 |
| 2462058 | 4/1976 | Fed. Rep. of Germany . |
| 2462059 | 4/1976 | Fed. Rep. of Germany . |
| 2451021 | 5/1976 | Fed. Rep. of Germany . |
| 2454753 | 5/1976 | Fed. Rep. of Germany . |
| 2515048 | 10/1976 | Fed. Rep. of Germany . |
| 2551580 | 5/1977 | Fed. Rep. of Germany . |
| 2637322 | 2/1978 | Fed. Rep. of Germany . |
| 2641886 | 3/1978 | Fed. Rep. of Germany . |
| 2649241 | 5/1978 | Fed. Rep. of Germany . |
| 2754623 | 6/1979 | Fed. Rep. of Germany . |
| 2810086 | 9/1979 | Fed. Rep. of Germany . |
| 955604 | 4/1964 | United Kingdom . |

OTHER PUBLICATIONS

Buchwald et al., Improvement of City Bus Fuel Economy using a Hydraulic Hybrid Propulsion System-A Theoretical and Experimental Study, SAE Technical Paper, (2/26/79), #790305.
Thoms, A Car that can Store Power, 73 Mechanix Illustrated, 60, 62, (11/77).
Scott, International Viewpoints, Automotive Engineering, (5/76); 102–107, (10/79).
Lindsley, Fuel-Saving Stepless Transmission, Popular Science, 72–74, 145, (12/76).
Bolon, Stop-Go Fuel Saver, Popular Science, 70, (7/80).
Norbye, VW's Stop/Start 21st-Century Car, Popular Science, 76–79, (7/80).
Layton, M. E. Alumni News, University of Minnesota, (Spring 1980).
Hagin et al., Drive Systems with Brake-Energy Recovery, 592–613, (4/14/80).
Tartaglia, A Low Pollutant, High Energy Efficiency Hybrid Hydraulic Power Plant, ASME Paper, (4/10/73).
Mosbech, Hybrid Vehicles 2–16, (Undated).
Beale, A Stirling-Hydrostatic Drive for Small Vehicles, IECEC '75 Record, 958–960, (1975), #759143.
Dewey et al., Accumulator-Charged Hydrostatic Drive for Cars Saves Energy, Hydraulics & Pneumatics, 180–183, (10/74).
Elder et al., Simulation of a Hydraulic Hybrid Vehicle Power Train, ASME Paper, (5/3/73).

*Primary Examiner*—Joseph F. Peters, Jr.
*Assistant Examiner*—M. J. Hill
*Attorney, Agent, or Firm*—Chernoff & Vilhauer

[57] ABSTRACT

A fuel-saving energy storage vehicle drive system which saves fuel, primarily under stop-and-go driving conditions, by collecting, storing and using energy normally lost in the braking or deceleration of the vehicle, by automatically controlled operation of the engine under certain conditions, and by automatically controlled use of the stored energy and engine respectively as alternative or supplemental prime movers for each other for driving the vehicle. Subsystems for preventing waste of deceleration energy and stored energy are provided, and compact transmission layout and packaging are provided which facilitate installation of the new system in existing vehicles.

9 Claims, 18 Drawing Figures

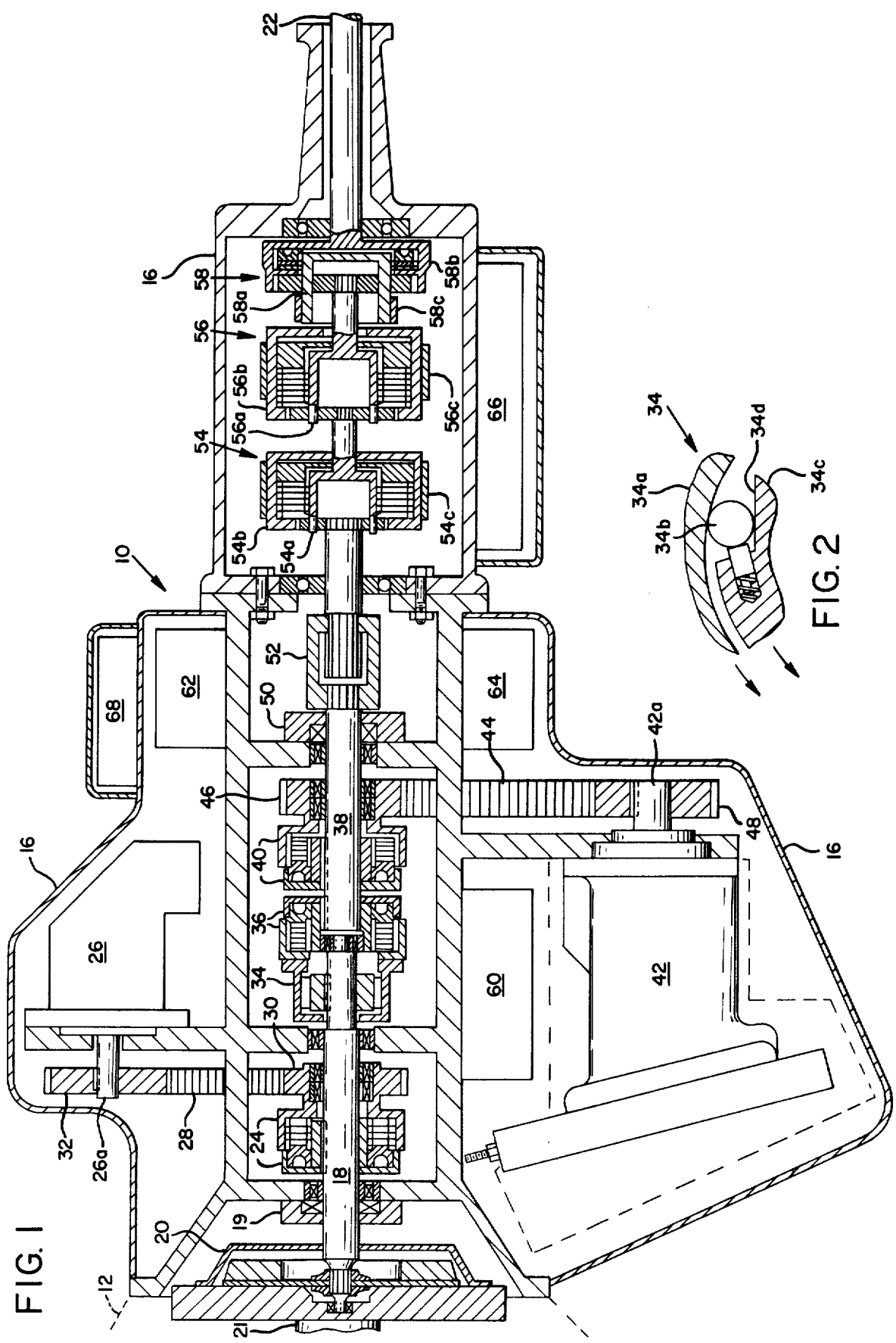

FIG. 3
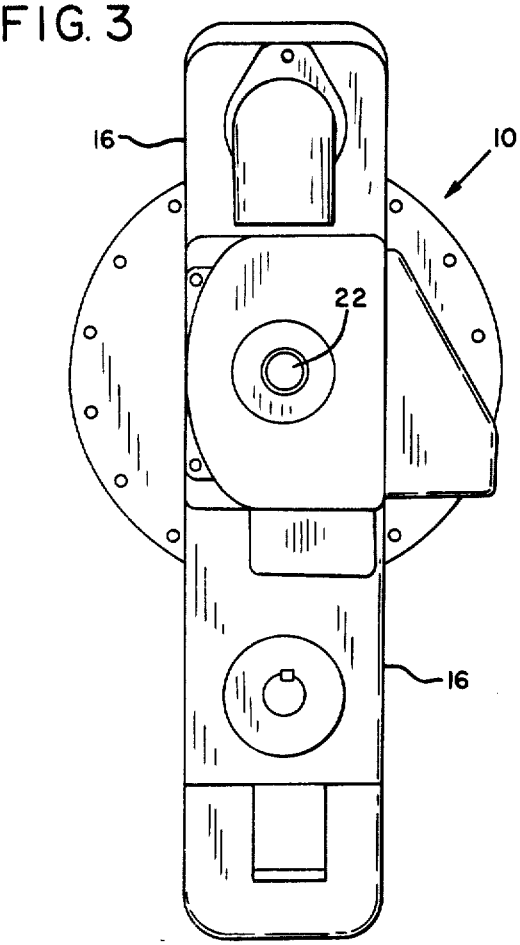
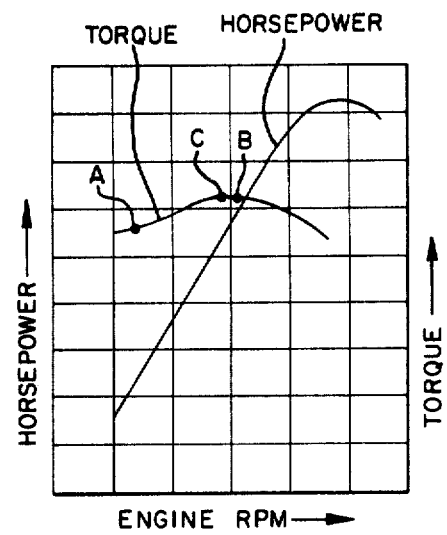
FIG. 15
FIG. 4A
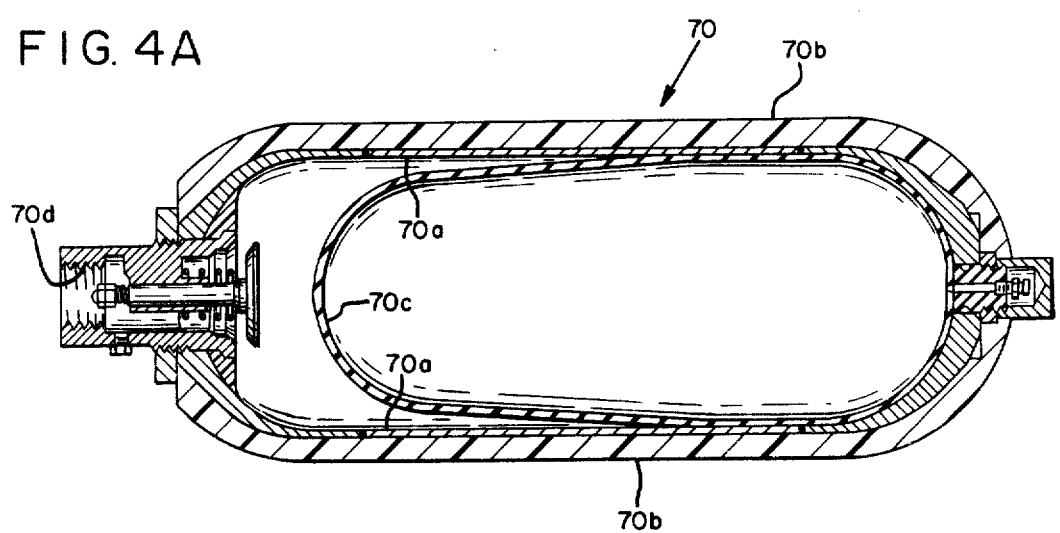

FIG. 5 TORQUE REQUESTS

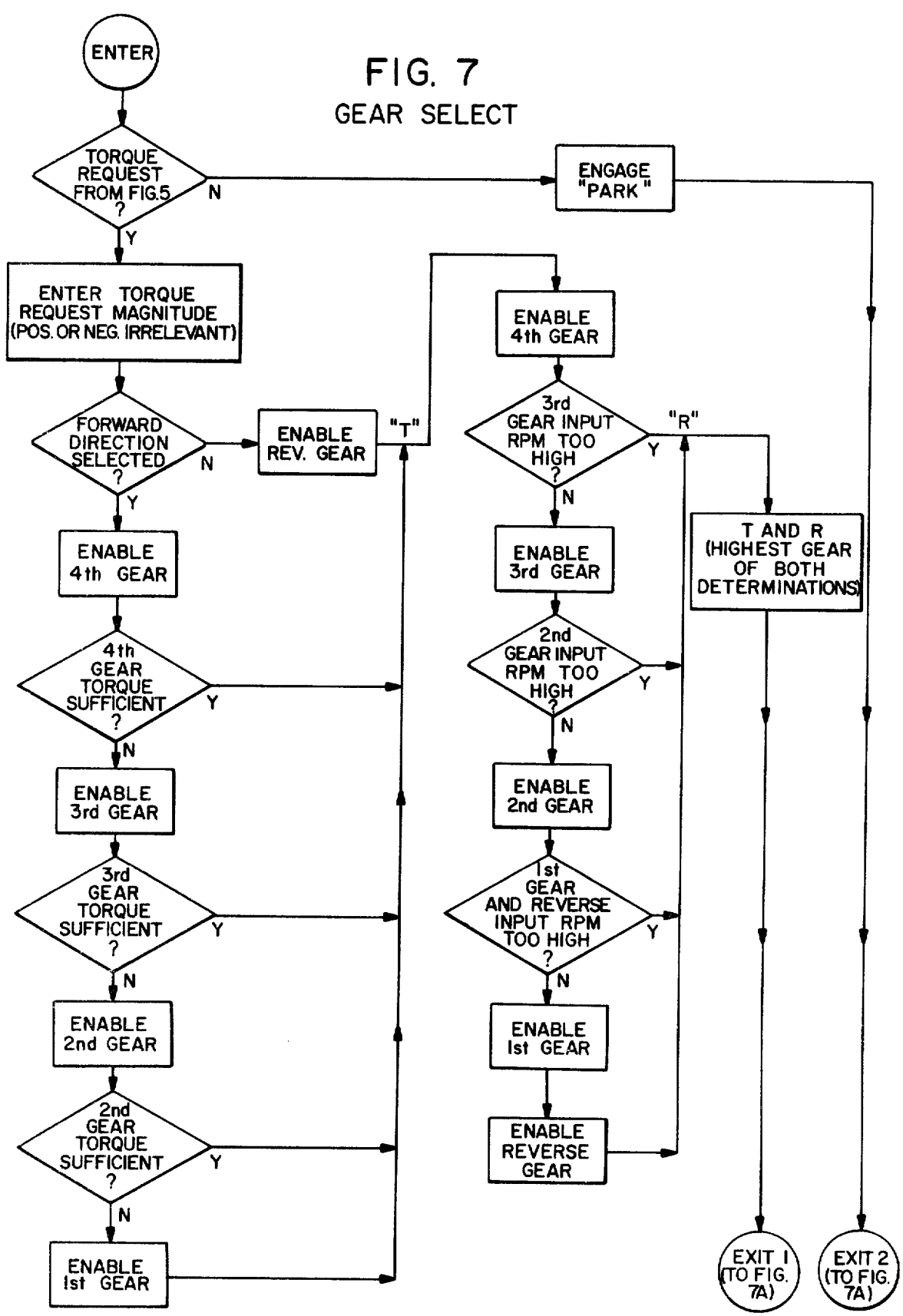

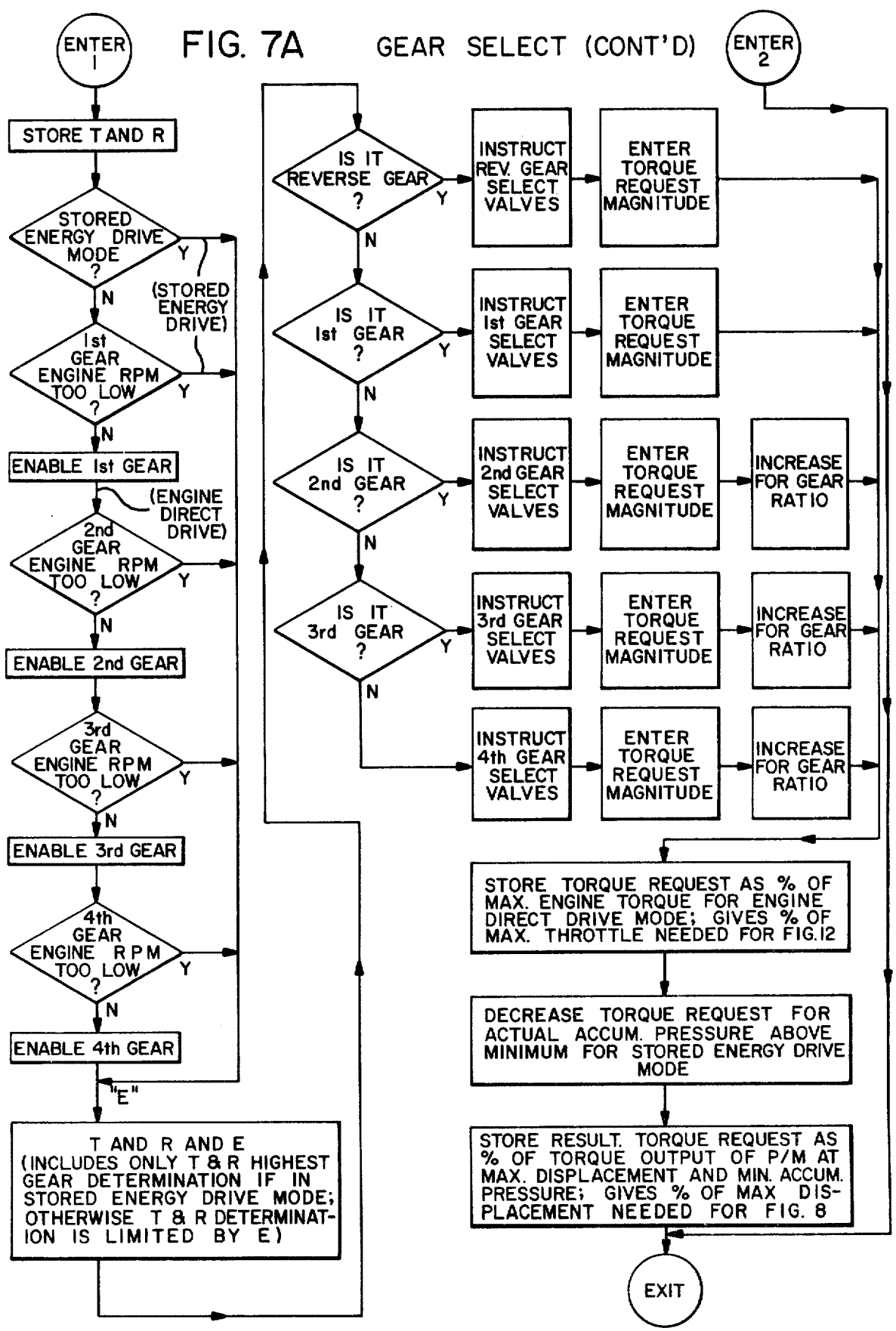

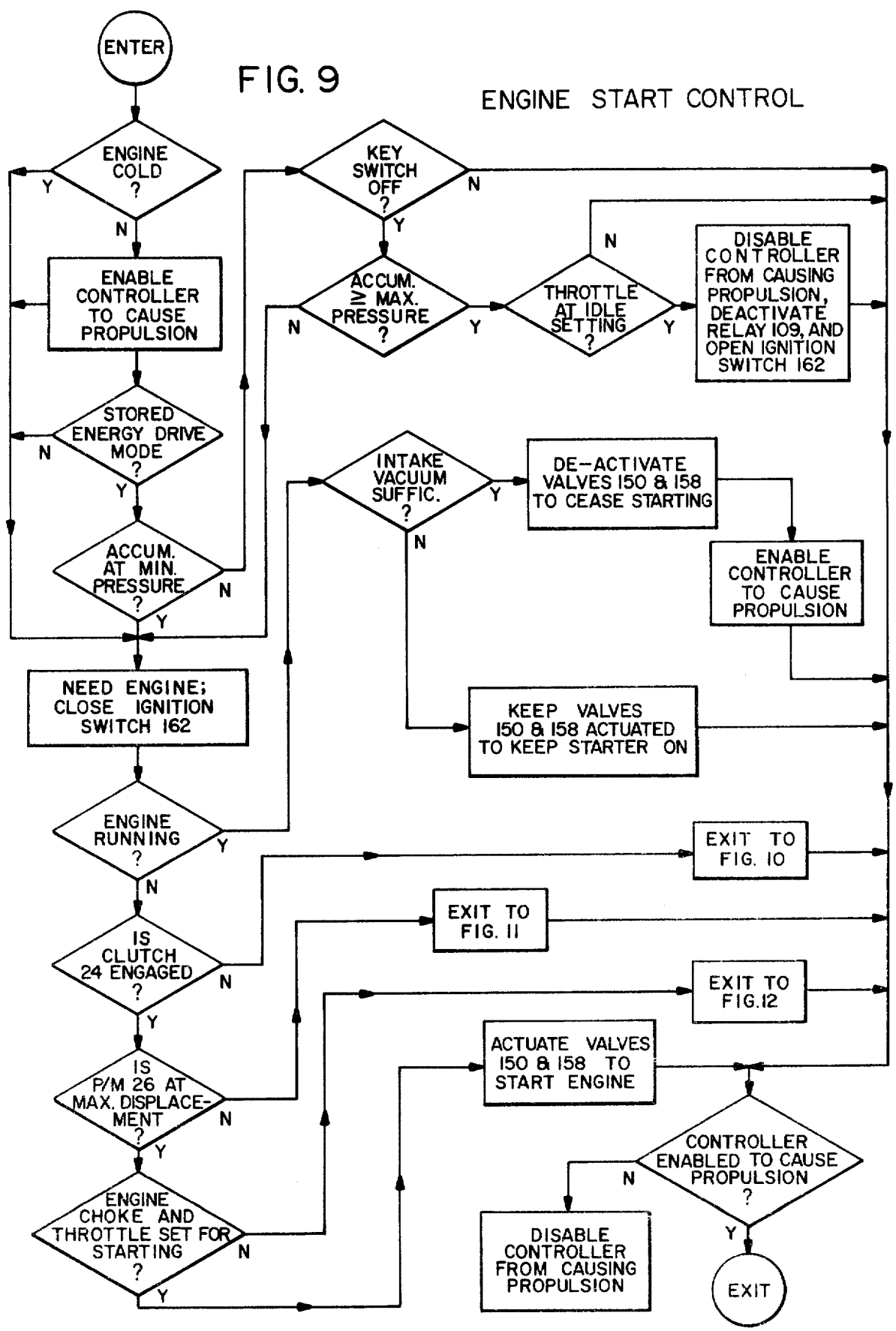
FIG. 9 ENGINE START CONTROL

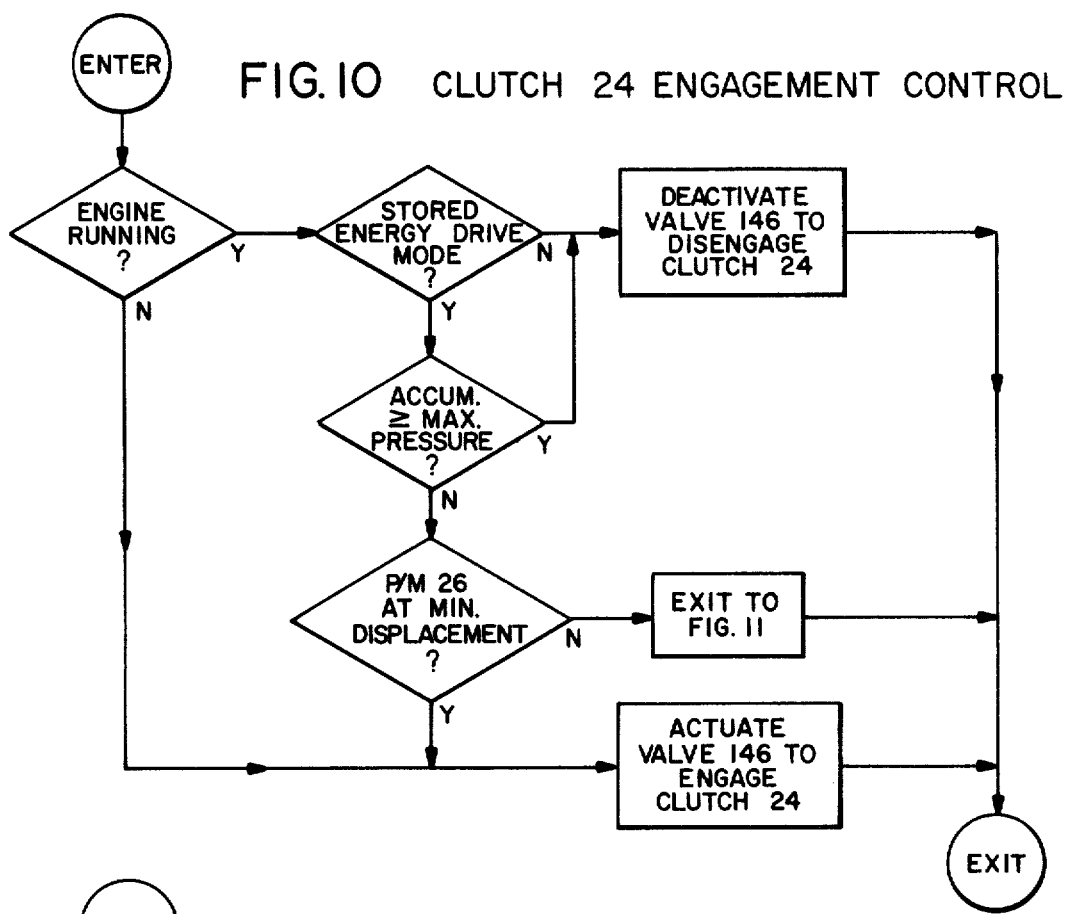
FIG. 10 CLUTCH 24 ENGAGEMENT CONTROL
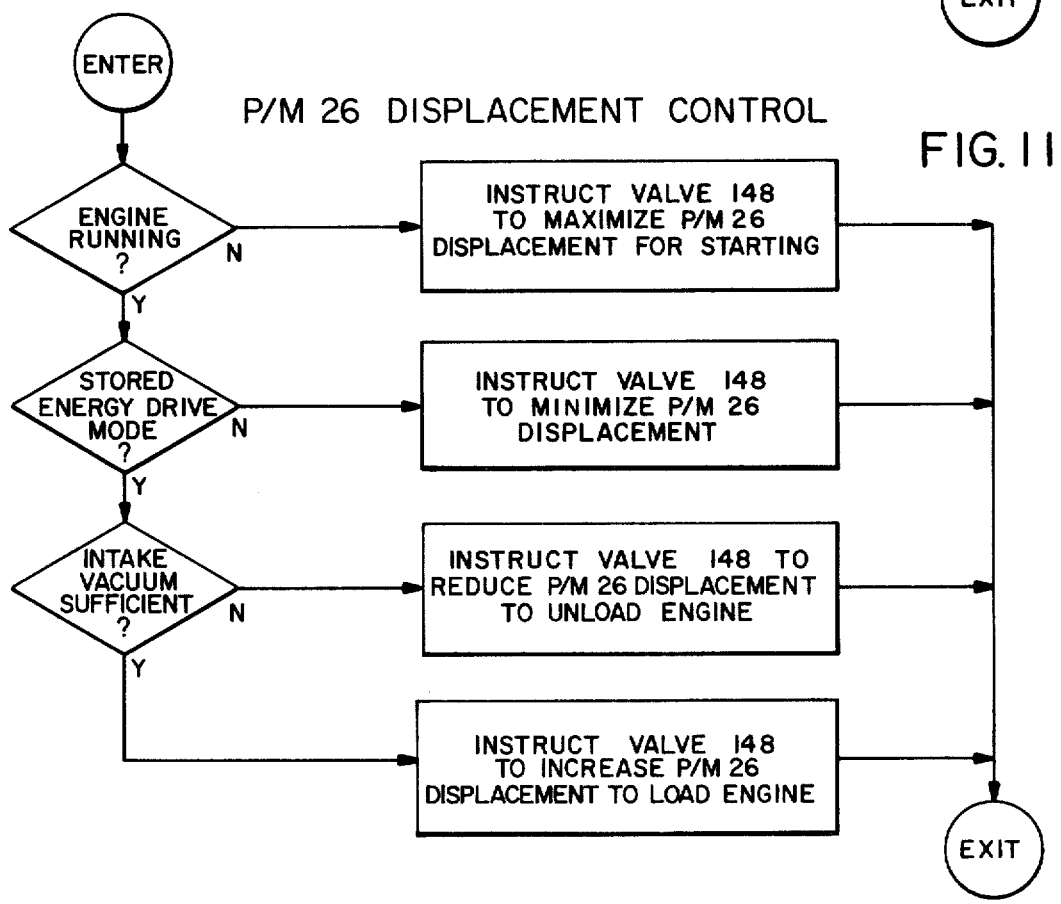
FIG. 11 P/M 26 DISPLACEMENT CONTROL

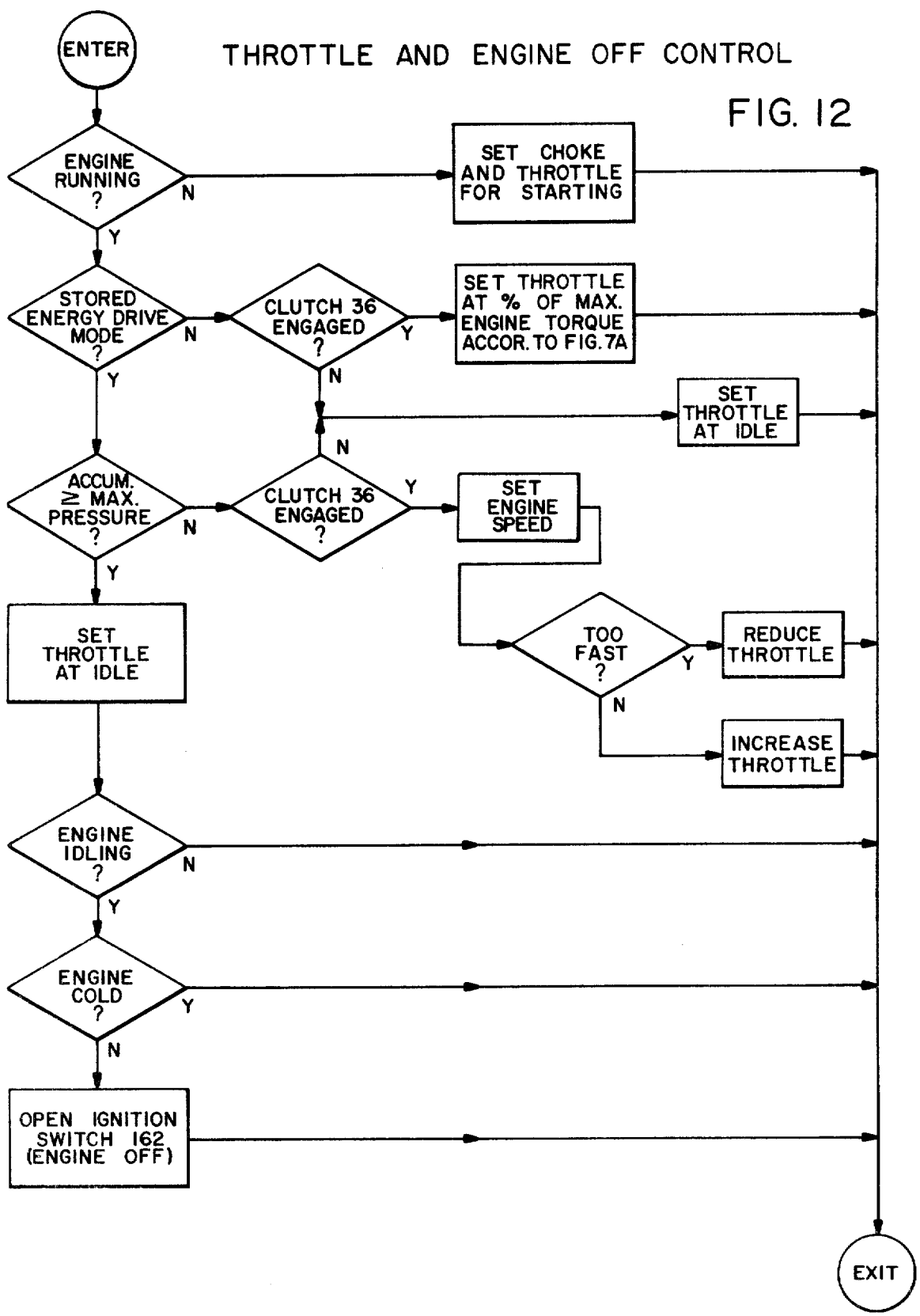

SELECTION OF MODE

FUEL-EFFICIENT ENERGY STORAGE AUTOMOTIVE DRIVE SYSTEM

BACKGROUND OF THE INVENTION

The present invention is directed to a fuel-saving energy storage drive system for engine-driven vehicles of all types, and is particularly effective for those vehicles which operate primarily under stop-and-go driving conditions prevalent in urban areas or whose tasks are such that they involve repeated acceleration and deceleration regardless of the area of operation.

For many years there has been recognition that vehicles could be made more fuel-efficient if the energy normally lost in decelerating or braking the vehicle could be somehow collected, stored and reused to accelerate the vehicle. A relatively large number of prior patents and published patent applications exist which are directed to various aspects of this general approach.

Some workers in the field have sought to collect and store the energy in hydraulic accumulators and then reuse the energy through fixed or variable displacement hydraulic transmissions. The most pertinent examples of this approach may be found in British Pat. No. 955,604, U.S. Pat. No. 3,892,283, 3,903,696 and 4,098,083, and in *Improvement of Citybus Fuel Economy Using a Hydraulic Hybrid Propulsion System—A Theoretical and Experimental Study*, SAE Technical Paper 790305 (1979).

Certain variations of this concept which utilize a flywheel as an accumulator for collecting and storing vehicle deceleration energy, either alone or in combination with a hydraulic accumulator, are shown in the following U.S. Pat. Nos. 3,665,788; 4,018,052; 4,037,409; 4,098,144; and 4,110,982. Also significant in this regard are published German patent application Nos.: 24 51 021; 24 54 753; 24 62 058; 25 15 048; 25 51 580; 26 37 322; 26 41 886; 26 49 241; 27 54 623 and 28 10 086.

The foregoing examples of work in the field to date have been concerned primarily only with the very basic mechanical aspects of developing a workable automotive transmission wherein the collection, storage and reuse or regeneration of braking energy is feasible, the thought being that any workable transmission which is capable of regenerating braking energy will save fuel. On the other hand, little thought has as yet been given to particular methods of control of the regenerative system so as to maximize its efficiency and thereby maximize the amount of energy which can be saved by its use.

Moreover, the emphasis on the importance of the brake energy regeneration capabilities of the transmission has tended to suppress the emphasis on the possible significance of other factors usable, either alone or in combination with a regenerative transmission, which by themselves can produce additional energy and fuel savings perhaps equal to those produced by brake energy regeneration alone. A principal factor to be considered in this regard is the efficient operation of the vehicle engine. Previously the recognition of the significance of this factor in combination with an energy storage transmission was exhibited primarily by the work of Vincent E. Carman as described by Thoms, *A Car That Can Store Power*, 73 Mechanix Illustrated 60, 62 (1977) in which a hydraulic brake energy regenerative transmission is described wherein a hydraulic accumulator stores energy supplied both from deceleration of the vehicle and from an engine-driven pump. When pressure in the accumulator reaches a predetermined point, the engine is switched off automatically and, when the accumulator pressure drops below a predetermined point, the engine is automatically started to drive the pump and increase accumulator pressure. In this system the engine does not idle, and is completely stopped for extended periods of time while the vehicle is in motion, thereby saving the fuel which would otherwise be wasted by engine idling. Moreover, when the engine is running, it is not driving the car directly but rather is pumping energy into the accumulator, thereby permitting the engine to be governed at a constant and relatively efficient speed. This type of engine control, whether used alone or in conjunction with a regenerative transmission, can produce an additional energy savings approximately equal to that produced by a regenerative system alone.

However, just as with the regenerative system, different efficiencies are obtainable depending upon the particular manner in which an engine stop-start system, and an engine governing system, are operated. For example, making engine starting dependent upon a fixed predetermined accumulator pressure does not take into account the variable ability of the vehicle regenerative system to supply energy to the accumulator when decelerating from variable vehicle speeds. Allowing the engine-driven pump to charge the accumulator to a relatively high pressure may be appropriate from an efficiency point of view when the vehicle is motionless, but it would not be appropriate to use engine energy to charge the accumulator to the same high pressure when the vehicle is in motion, and particularly not so when the speed of the vehicle is relatively high because at such speed the vehicle has an increased potential for supplying energy to the accumulator from deceleration. If the accumulator is already charged too highly by the engine it will not be able to accept energy supplied to it from deceleration, and such energy will therefore be wasted.

Moreover, governing of engine speed by itself does not produce as energy-efficient an operation as when both engine speed and engine output torque are governed. In addition, too frequent stopping and starting of the engine to charge the accumulator may be harmful to efficiency because of excessive use of energy to start the engine, and also be harmful to the acceptability of the vehicle's exhaust emissions.

There are widely varying degrees of efficiency with which stored energy, whether stored from vehicle deceleration or from the engine or from both, can be used to drive a vehicle. It will not always be most efficient to drive a vehicle from stored energy; under certain conditions it will be more efficient to drive the vehicle directly by means of the engine, and in such case engine speed should not be governed but should be controllable in response to operator torque demands.

Furthermore, when using or collecting the stored energy, significant wastage can occur if steps are not taken to prevent inefficient use of the transmission, particularly of its variable displacement hydraulic components, and to prevent wheel skidding and wheel spinning. The latter can pose a particular problem due to the high level of torque which can be produced from an energy storage transmission despite the reduced size of the engine.

In addition, to make fuel-efficient drive systems of the type described available in large quantity so as to use their advantages to combat the current energy crisis at the earliest possible date, they must not require extensive redesign of existing vehicles but should, preferably, be capable of installation in conventional vehicle drive trains as replacements for conventional transmissions now being used, with a minimum of complexity and structural modification to the vehicle.

SUMMARY OF THE PRESENT INVENTION

The present invention is directed to a fuel-efficient energy storage vehicle drive system. While the description and claims which follow relate to a "wheeled" vehicle, it will be understood that the word "wheel" is used broadly herein to include different types of rotating devices which propel vehicles such as, for example, sprockets upon which the tracks of tracked vehicles are mounted.

The system includes an energy accumulator, which is preferably of the hydraulic accumulator type but may alternatively comprise a flywheel or torsional energy storage device alone or in combination with a hydraulic accumulator. The system is preferably regenerative in that it collects and stores energy normally lost in decelerating or braking the vehicle and reuses the energy to accelerate and drive the vehicle; however certain aspects of the invention are equally applicable to nonregenerative energy storage systems since energy can be stored from either vehicle deceleration or from the vehicle engine. The system is preferably of the dual-mode type wherein stored energy and the engine are used as alternative or mutually supplemental prime movers of the vehicle; however certain aspects of the system are equally applicable to a system in which only stored energy is used as the prime mover for driving the vehicle.

A principal objective of the present invention is to improve the efficiency of such an energy storage drive system by minimizing energy losses in supplying energy to the energy storage device either from the braking or deceleration of the vehicle or from the engine, or from both, and to minimize energy losses in using such stored energy.

It is a further principal objective of the present invention to improve the efficiency of an energy storage vehicle drive system by automatically controlling operation of the engine in the most energy-efficient manner.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a simplified sectional view of the transmission portion of the drive system of the present invention.

FIG. 2 is a detail partial view of the inner and outer race and bearing structure of the overrunning clutch employed in the transmission of FIG. 1.

FIG. 3 is an end view of the transmission of FIG. 1 as seen from the output shaft end.

FIG. 4A is a sectional view of an exemplary hydraulic accumulator employed in the drive system.

FIGS. 5-14 are logic flow diagrams illustrating the automatic decision-making functions of the controller which regulates the drive system.

FIG. 15 is an engine rating graph exemplifying the principles involved in regulating the vehicle engine for maximum fuel economy.

DESCRIPTION OF THE PREFERRED EMBODIMENT

GENERAL LAYOUT

The preferred embodiment of the drive system of the present invention includes the following basic elements:

(1) a power transmission inserted mechanically between the engine and the drive wheel or wheels;

(2) one or more hydraulic accumulators;

(3) one or more hydraulic reservoirs;

(4) an engine throttle and ignition control assembly; and (5) a central controller, such as a microprocessor-based digital computer, for all functions.

Figure 4:
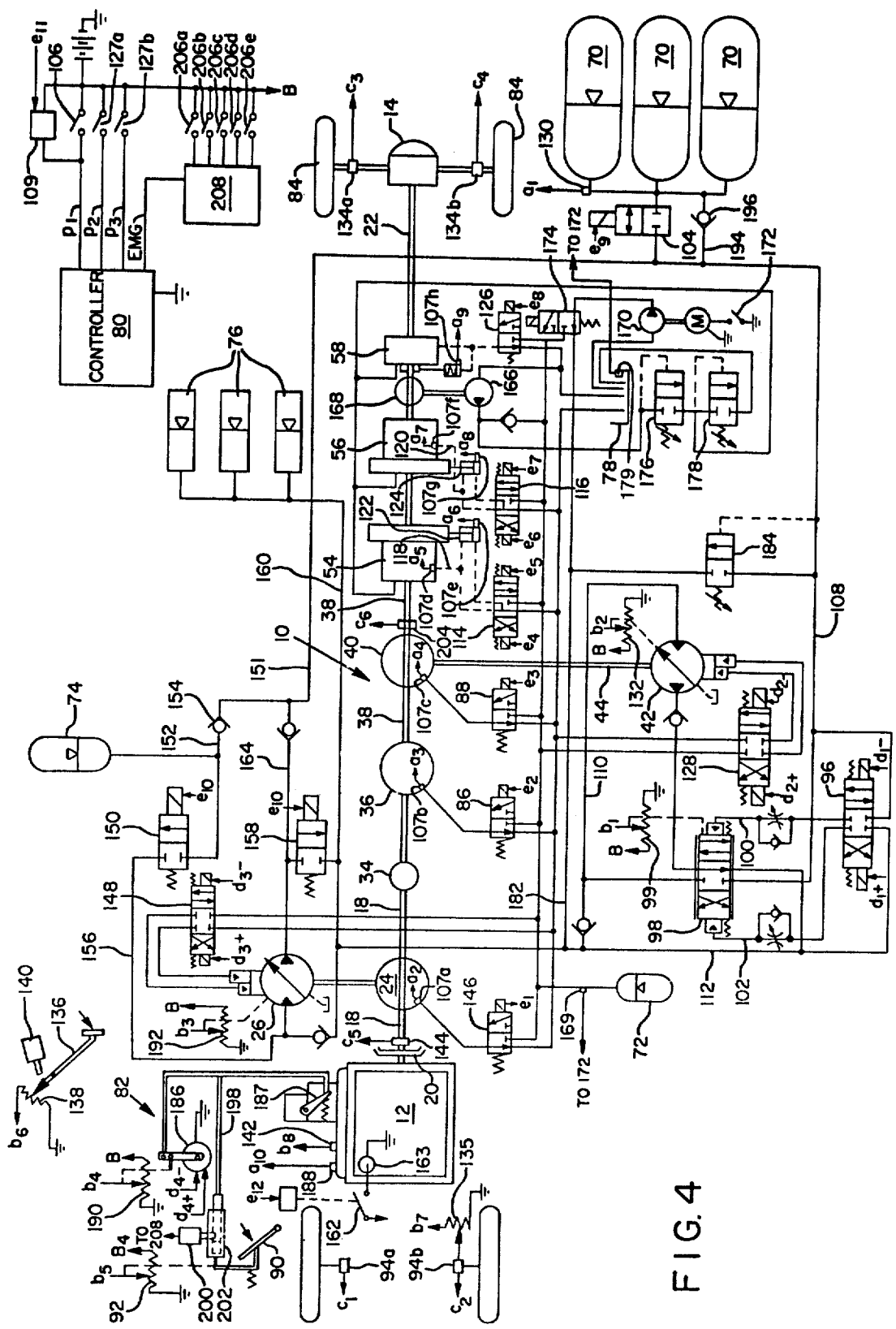
FIG. 4 is a schematic circuit diagram of the drive system of the present invention, including a throttle control assembly.

FIG. 1 depicts only the power transmission portion, indicated generally as 10, of the total drive system. The transmission 10 is physically inserted between the vehicle engine 12 (which may be, but is not necessarily, an internal combustion engine) and a vehicle final drive assembly, usually a differential 14 (FIG. 4). The transmission 10 is packaged in an elongate housing 16 within which are enclosed the various elements of the transmission. An input shaft 18 extends into the transmission housing 16 through a fluid seal 19, and is driven through a conventional mechanical clutch and pressure plate assembly 20 by the engine crank shaft 21. An output shaft 22 extends from the opposite end of the housing 16 for connection to the differential 14.

Fixedly attached by a splined connection to the input shaft 18 is a hydraulic pressure actuated clutch assembly 24 which, when engaged, permits the shaft 18 to drive, or be driven by, a variable displacement hydraulic pump-motor 26 through a chain 28 and sprockets 30 and 32 respectively. When the clutch 24 is not engaged, no driving connection exists between the input shaft 18 and pump-motor 26. The pump-motor 26, when being used as a motor, is used primarily for starting the engine 12.

Also fixedly attached to the input shaft 18 is an overrunning clutch assembly 34, preferably of the roller-ramp type capable of transmitting torque from the shaft 18 but not transmitting torque to the shaft 18. Such overrunning clutches are well known and comprise a cylindrical outer race 34a (FIG. 2) separated by solid cylindrical rollers 34b from an inner race 34c having precision ground inclined ramps such as 34d formed thereon. When the engine is driving the inner race at a speed at least as great as the speed of the outer race in the direction indicated by the arrows in FIG. 2, each roller 34b is forced up its respective inclined ramp (i.e. to the right in FIG. 2) locking the race and roller components to transmit torque. Alternatively, when the outer race is driving faster than the inner race in such direction, or the engine is driving the inner race at a speed less than that of the outer race, each roller 34b is forced down its respective inclined ramp (i.e. to the left in FIG. 2) permitting freewheeling or overrunning of the clutch and thereby preventing the transmission of torque to or from the shaft 18.

The outer race 34a of the overrunning clutch assembly 34 has connected to it a further hydraulically actuated clutch assembly 36 which is fixedly splined to a shaft 38 which is coaxial with input shaft 18. When clutch assembly 36 is disengaged, no torque can be transmitted from shaft 18 to shaft 38. However, upon engagement of clutch assembly 36, drive torque can be transmitted from shaft 18 through overrunning clutch 34 and clutch assembly 36 to shaft 38. Regardless of the engagement of clutch 36 however, no torque can be transmitted from shaft 38 to shaft 18 because of the presence of the overrunning clutch 34.

Fixedly splined to shaft 38 is a further hydraulically actuated clutch assembly 40 through which shaft 38 may drive, or be driven by, a variable displacement hydraulic pump-motor 42 acting through chain 44 and sprockets 46 and 48 respectively. It will be noticed that the respective pump-motors 26 and 42 are located radially outwardly of the axis of rotation of the respective shafts 18 and 38 in positions diametrically opposed to one another. This permits the transmission to be installed beneath a vehicle with each of the pump-motors extending substantially horizontally in opposite directions from the shafts 18 and 38 thereby requiring a minimum of space above the transmission housing while providing maximum road clearance below the transmission housing. The unusual space-saving configuration of the transmission 10 which results from this arrangement is best seen in the end view of FIG. 3.

The shaft 38 passes through a fluid seal assembly 50 and a shaft coupling 52 into a multiratio gearbox or torque converter assembly having three gear sets 54, 56 and 58 respectively. These gear sets are conventional and, in combination, are very similar to the well-known "hydramatic" gear assemblies which provide four ratios forward and one in reverse (however the gear sets are electrically controlled which is unconventional). To briefly summarize the ratio changing functions of the gear sets 54, 56 and 58, it will be appreciated that if the cages 54a, 56a and 58a respectively are each locked to their surrounding ring gears 54b, 56b and 58b respectively, there will result a 1:1 speed and torque transmission ratio between shaft 38 and output shaft 22. This is fourth or "high" gear. If, on the other hand, the multiplate clutches of gear sets 54 and 56 respectively are released so that the cages are free to rotate with respect to their respective ring gears, and if each ring gear 54b and 56b is locked against rotation by a respective band 54c and 56c, the resultant compound gear reduction provided by both gear sets 54 and 56 will cause the rotational speed of the output shaft 22 to be several times lower than that of shaft 38 while the torque applied to the output shaft 22 will be an equal number of times greater than the torque applied from shaft 38. This represents first or "low" gear. Between first and fourth gears, two intermediate ratios (i.e. second and third gears) can be provided by placing each of the gear sets 54 and 56 in opposite conditions. Two intermediate gear ratios are provided because the two gear sets 54 and 56 are designed to produce different ratios when their respective planet gear cages are free to rotate in relation to their respective locked ring gears.

Gear set 58 is designed to provide reverse vehicle motion when actuated. In order to provide reverse rotation between shaft 38 and output shaft 22, its construction differs from that of the other two gear sets. The output shaft 22, rather than being connected to the cage 58a, is instead connected to the ring gear 58b. The band 58c, rather than engaging the ring gear 58b when actuated, instead engages the cage 58a to lock it against rotation. This causes a reverse rotation of the ring gear 58b and thus reverse rotation of the output shaft 22. Since reverse gear is used much less than any of the other gear ratios, the multiplate clutch which locks the cage 58a to the ring gear 58b is spring-loaded to the engaged position rather than to the disengaged position for normal forward driving, while the band 58c is spring-biased to its disengaged position for normal forward driving. Therefore the application of hydraulic pressure simultaneously to both the clutch and the band overcomes the spring biasing and actuates reverse gear. The relationship between shaft 38 and output shaft 22 through the gear sets 54, 56 and 58 is such that shaft 38 may either drive, or be driven by, shaft 22 in each of the possible gear ratios.

Certain other components packaged within the transmission housing 16 include housings 60, 62, 64 and 66 for various solenoid-operated hydraulic valves and their actuators to be described hereafter, and a controller interface station 68 through which electrical signals from various sensors within the transmission are transmitted to a central controller and through which electrical control signals are received from the controller to actuate the various hydraulic valves.

From the foregoing description of the transmission portion 10 of the drive system, it will be apparent that the transmission 10 is capable of selectively creating any of the following alternative driving relationships. Shaft 38, which drives output shaft 22 through the various gear sets 54, 56 and 58, may receive vehicle propulsion torque either from the drive shaft 42a of the pump-motor 42 by engagement of clutch assembly 40 or directly from the engine 12 through input shaft 18 by the engagement of clutch assembly 36. (Although in the preferred embodiment the use of clutch assemblies 36 and 40 respectively dictates that the shaft 38 will receive propulsion power from either one or the other of pump-motor 42 or shaft 18, it must be recognized that it would be possible alternatively, if desired, to substitute for the clutch assemblies 36 and 40 a power-split planetary gear assembly of well-known design which permits controllable variable power inputs simultaneously from both the pump-motor 42 and input shaft 18 to the shaft 38 so that, by variable control of the power-split gear assembly, the majority of power could be transmitted to shaft 38 from one or the other of the two sources. (Known power-split gear assemblies are shown for example in the aforementioned U.S. Pat. Nos. 3,665,788 and 4,098,144.)

Transmission 10 is also capable of transmitting drive power from the output shaft 22 through the gear sets 54, 56 and 58 and through shaft 38 and clutch assembly 40 when engaged to the input-output shaft 42a of the pump-motor 42. However no drive power can similarly be transmitted from the shaft 38 through clutch assembly 36 to the engine 12 because of the presence of the overrunning clutch 34.

It will also be noted from the previous discussion that engine 12, acting through input shaft 18, may transmit driving power from the engine alternatively either to shaft 38 and thus to output shaft 22 through clutch 36 when engaged, or to the drive shaft 26a of the pump-motor 26 when clutch assembly 24 is engaged. The input shaft 18 and engine 12 may likewise receive driving power from the drive shaft 26a of pump-motor 26 through clutch assembly 24 when engaged, but of course may not receive drive power from shaft 38 because of overrunning clutch 34 as previously explained.

The simple and compact coaxial arrangement of shafts 18, 38 and 22, clutch assemblies 24, 34, 36 and 40, and gear sets 54, 56 and 58, in combination with the diametrically opposed radial positions of the two pump-motors 26 and 42 respectively, are important factors in enabling the transmission 10 to be constructed in such a way that it may be inserted into drive trains of conventional vehicle design between the existing engine crankshaft and the differential drive shaft, replacing the original transmission without need to disturb the normal coaxial arrangement of the engine crankshaft and differential drive shaft and without space or clearance problems above or below the transmission 10. For those vehicle applications where the foregoing transmission configuration would result in too long a transmission, the gear sets 54, 56 and 58 could be moved from their above-described positions to positions radially offset from the common axis of the shafts 18, 38 and 22 and connected thereto by appropriate gear or chain assemblies.

In the schematic diagram of FIG. 4, the circuit elements of the transmission 10 are shown in detail, together with the other drive system components which include high-pressure main drive hydraulic accumulators 70, high-pressure engine starter accumulator 74, and low-pressure accumulator 72 for supplying a clutch and pump-motor displacement control circuit. Also included are low-pressure main hydraulic reservoirs 76 and a transmission pump 78. Completing the system are an electronic controller 80, preferably a microprocessor-based digital computer to be described hereafter, and an engine throttle and ignition control assembly indicated generally as 82. All components other than the transmission 10 may be positioned at any convenient location in the particular vehicle, such placement varying from vehicle to vehicle according to available space provided by the particular vehicle design.

The preferred construction of the hydraulic accumulators is as shown in FIG. 4A, so as to minimize the mass added to the vehicle by the accumulators which would otherwise detract fro the energy-savings provided by the drive system. Since the accumulators store hydraulic oil at high pressure (on the order of 5000 p.s.i.), their shells must be extremely strong. Normally a heavy thickness of metal having considerable weight would be required to provide such strength. However such weight may be reduced to a small fraction thereof by making the metal content 70a of the shell extremely thin, and reinforcing its exterior to provide the needed strength by wrapping it with a greater thickness of reinforcing material having a lower specific gravity than that of metal, such as the fiberglass layers 70b. The interior of the shell is provided with an expandable and contractable gas-impervious rubber bladder 70c for containing a compressible gas, such as nitrogen. The gas imposes pressure on the hydraulic oil which enters through port 70d into the portion of the accumulator exterior of the bladder 70c. The bladder functions to prevent the gas from intermingling with the oil and dissolving therein under high pressure, which would otherwise cause cavitation of the pump-motors 26 and 42 since such dissolved gas would come out of solution when subjected to low-pressure conditions at the inputs of the pump-motors when they are operating as pumps.

The low-pressure clutch and pump-motor displacement control circuit accumulator 72 is normally kept charged by a discontinuously driven fixed displacement pump 166 which draws fluid from transmission sump 78 and drive power from power take-off 168 in the transmission 10. However, because long periods of disuse of the vehicle can permit discharge of the accumulator 72 to the point where the respective transmission clutches cannot effectively be engaged, an electrically driven pump 170 is also provided selectively operable by a switch 172 to charge the accumulator 72 if needed. The switch 172 and solenoid valve 174 are selectively operable to cause the pump 170 to deliver fluid from the transmission sump 78 to the accumulator 72 if its pressure level falls below a predetermined minimum as sensed by pressure sensor 169 which controls switch 172 and valve 174 through a suitable relay (not shown). Moreover, since the transmission sump 78 will, in normal operation, receive fluid from the case drains of pump-motors 26 and 42, eventually excess fluid will cause an overfill situation in sump 78, in which case this condition will be sensed through fluid level sensor 179 which, also acting through a suitable relay (not shown), will close switch 172, without also actuating valve 714, thereby enabling pump 170 to transfer fluid from sump 78 to the main reservoirs 76. Valve 176 is a conventional clutch pressure modulation valve for the gear sets 54, 56 and 58, and valve 178 is an adjustable clutch pressure relief valve for the gear sets.

It should be noted that such specifications as accumulator, reservoir and pump-motor volumetric capacities, gear ratios, engine size, and the numerical values of such physical parameters as pressure, torque, vehicle speed, temperature and other variables sensed and acted upon automatically by the drive system of the present invention will vary from vehicle to vehicle depending upon such conditions as its mass and type of usage expected. The present invention therefore, rathr than being directed to any quantitative parameters, is directed to general principles of operation applicable to all vehicles.

The specific functions of the remaining components of the drive system as shown in FIG. 4 can best be described in relation to the different modes of operation of the drive system. In summary, the major modes include a "stored energy drive" mode in which all positive torque requests by the operator (i.e. acceleration or speed maintenance requests) are satisfied by the supply of pressurized hydraulic fluid from the accumulators 70 to drive the wheels 84 through the pump-motor 42 and negative torque requests (i.e. braking or deceleration requests) are satisfied by the wheels 84 driving the pump-motor 42 as a pump to charge the accumulators 70 with pressurized hydraulic fluid. During the "stored energy drive" mode, the vehicle engine 12 is either not being used or, if used, is charging the accumulators 70 with pressurized fluid by driving pump-motor 26. The other major mode of operation of the drive system is the "engine direct drive" mode in which the engine 12 drives the wheels 84 through the transmission 10 in response to positive torque requests by the operator. However, the "engine direct drive" mode is not used during times of negative torque requests nor under certain other conditions to be described hereafter. These modes of operation, and the resultant functions of the various components of the drive system, will now be described in greater detail.

STORED ENERGY DRIVE MODE

In this mode of operation clutch assembly 36 is disengaged, such that no torque may be transmitted from the engine 12 through input shaft 18 to shaft 38, and clutch assembly 40 is engaged such that torque may be transmitted to shaft 38 by pump-motor 42 driven as a motor, or alternatively from shaft 38 to pump-motor 42 driven as a pump. In this mode clutch 36 is disengaged by relieving hydraulic pressure therein through unactuated solenoid valve 86 to sump 78. Conversely clutch assembly 40 is engaged by the actuation of solenoid valve 88 thereby moving it to the left as seen in FIG. 4 and introducing fluid under pressure to clutch assembly 40 through valve 88 from hydraulic accumulator 72. (For purposes of the following discussion, the engaged or disengaged conditions of the respective clutches 24, 36 and 40, and of the respective multiplate clutches and bands of the gear sets 54, 56 and 58, are sensed by the controller 80 through respective conventional pressure sensor transducers 107a, b, c, d, e, f, g and h.) Accumulator exhaust solenoid valve 104 is open due to the closure of operator keyswitch 106, which also energizes the controller 80.

Positive Torque Requests

Figure 5:
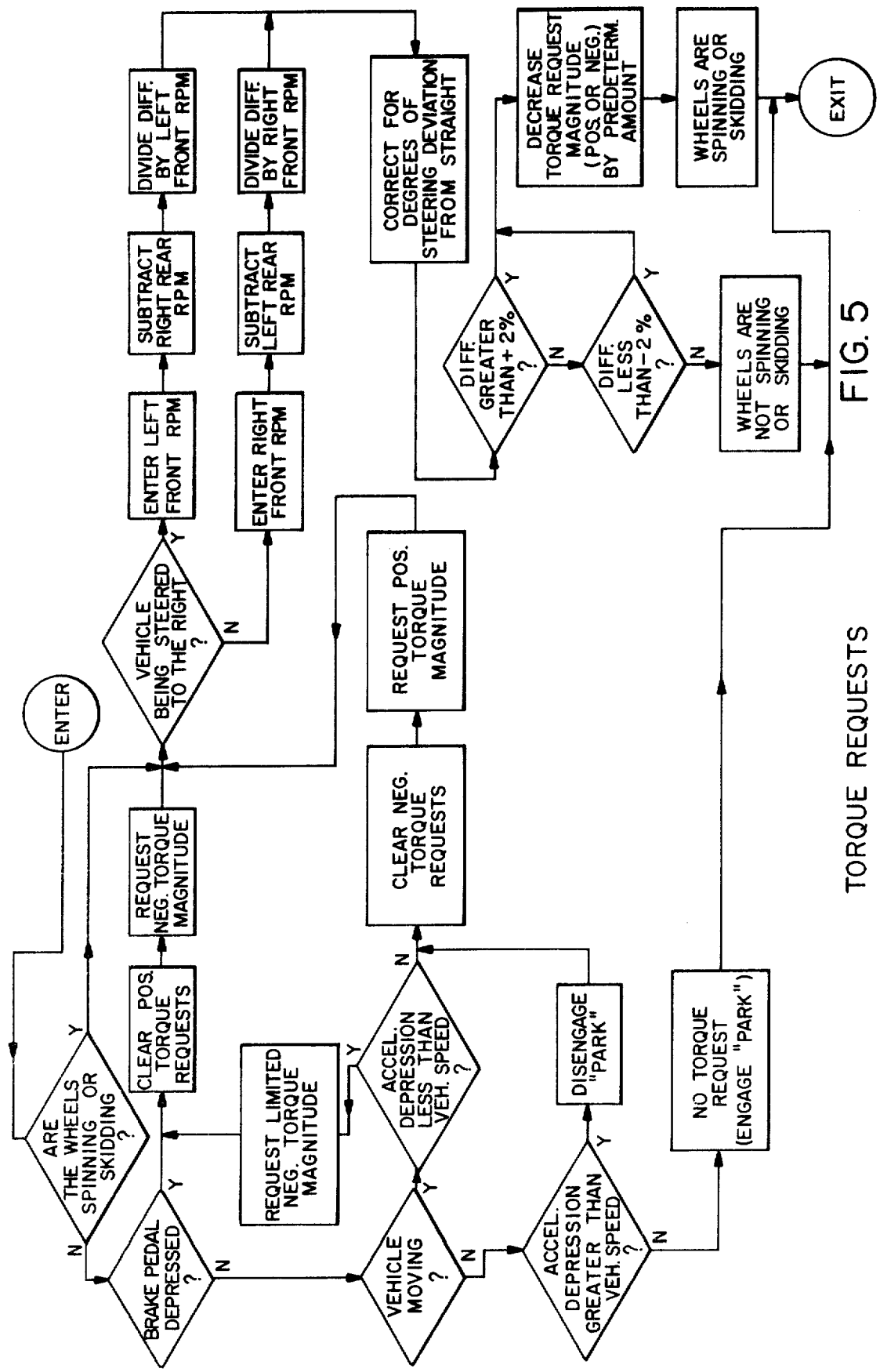

Operator positive torque requests are sensed by the degree of depression by the operator of an accelerator pedal 90, such degree of depression being sensed by the controller 80 through a variable potentiometer 92. All degrees of depression of the accelerator pedal 90 are considered by the controller 80 as indicative of different desired vehicle speeds (e.g. no depression signifying zero desired speed). The speed indicated by the degree of depression of the accelerator 90 is compared by the controller to the actual speed of the vehicle as sensed through nondriven wheel rotation speed sensors 94a and 94b, the readings from which are averaged to compensate for steering. A positive degree of difference between the desired speed signal received by the controller from potentiometer 92 and the actual speed signal received from sensors 94a and 94b is considered by the controller to be indicative of positive torque desired by the operator to accelerate the vehicle, the magnitude of such positive torque increasing proportionally to the magnitude of the difference. FIG. 5 shows an exemplary logic flow diagram by which the controller 80 determines and processes both positive torque requests and negative torque requests (the latter to be covered in a subsequent section hereof).

Figure 6:
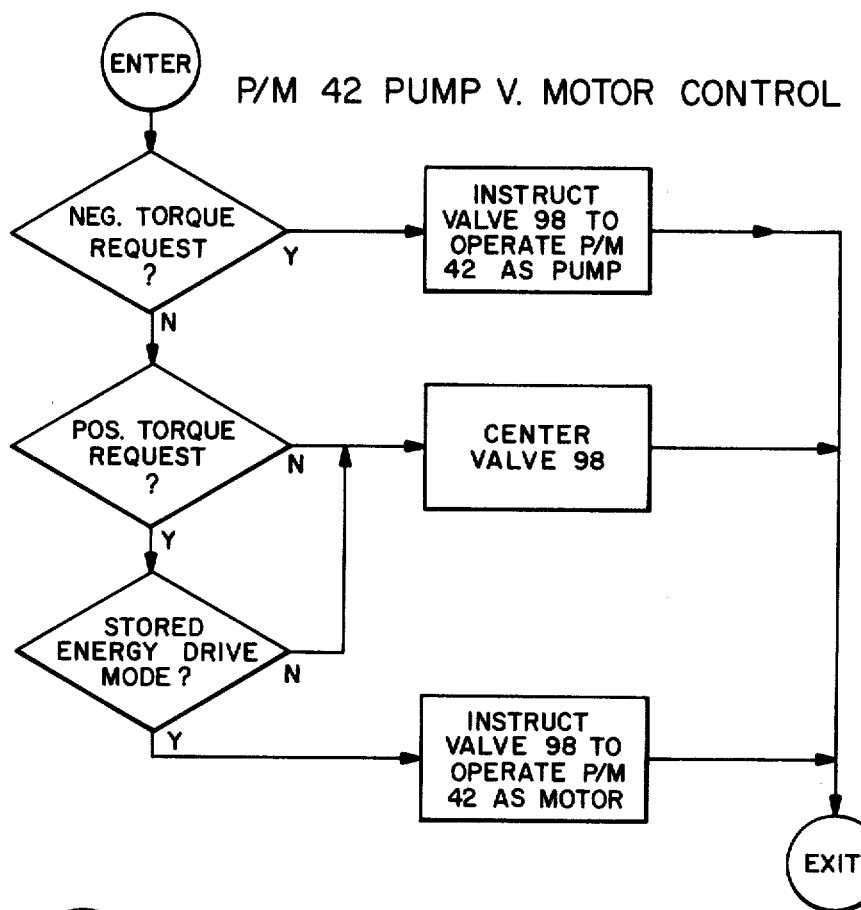

Any positive torque request causes the controller 80, acting in accordance with the logic flow diagram of FIG. 6, to shift solenoid valve 96 to the left as seen in FIG. 4, thereby shifting valve 98 also to the left by the introduction of pilot pressure through pilot line 100 and the exhausting of pilot pressure through pilot line 102. The movement of valve 98 to the left allows the introduction of hydraulic fluid under pressure from accumulators 70 through solenoid valve 104 and hydraulic condiuts 108 and 110 to the inlet of pump-motor 42. Simultaneously valve 98 connects the outlet of pump-motor 42 through conduit 112 to the low pressure hydraulic reservoirs 76. Accordingly pump-motor 42 is driven as a motor by the hydraulic fluid and therefore drives shaft 38, output shaft 22 and thus the vehicle wheels 84 through chain 44 and engaged clutch 40. The controller 80 senses the position of valve 98 through a potentiometer 99.

The manner in which the drive torque delivered to the wheels 84 from the pump-motor 42 properly reflects the magnitude of the operator's torque request will now be explained. As an introductory note, it must be understood that, since the objective of the present drive system is to optimize efficiency by maximizing the conservation of energy, the drive system will satisfy the operator's positive torque requests only within certain limits which are consistent with high efficiency and energy conservation. In this regard, two important limiting factors are: (1) the fact that the energy-efficiency of any variable displacement hydraulic device such as pump-motor 42 increases with higher displacement settings and decreases with lower displacement settings; and (2) any excess of torque delivered to the wheels 84 which would permit them to slip or spin with respect to the road surface is wasteful of energy. Accordingly the manner in which the magnitude of the operator's positive torque requests are satisfied is automatically controlled in the present drive system such as to maximize the displacement setting of the pump-motor 42 and prevent slipping or spinning of the wheels 84.

Maximizing of the displacement of pump-motor 42 is accomplished through the automatic selection of an optimum gear ratio from the four different gear ratios provided by the gear sets 54 and 56 in forward drive. Mechanically, these selections are made through the selective actuation of solenoid valves 114 and 116 by the controller 80. Thus the highest gear (fourth gear), which provides the least multiplication (i.e. 1:1) of the output torque of the pump-motor 42 and thus would require the maximum displacement of pump-motor 42 to satisfy any particular torque request, is actuated by the controller's moving both valves 114 and 116 to the right as seen in FIG. 4, thereby introducing pressure through pilot lines 118 and 120 respectively to lock the cages 54a and 56a to the ring gears 54b and 56b respectively while releasing the hydraulic cylinders 122 and 124 and thereby releasing the bands 54c and 56c respectively. Meanwhile reverse actuation solenoid valve 126 remains in its unactuated condition so as to permit a straight-through drive in the gear set 58. Third gear, which increases the multiplication of the torque obtained from pump-motor 42 and thereby decreases the displacement of pump-motor 42 required to satisfy any given torque request, is actuated by moving valve 116 to the right while moving valve 114 to the left as seen in FIG. 4. This unlocks the cage 54a from the ring gear 54b while applying pressure to lock the band 54c, thereby causing a torque multiplication (usually by a multiple comprising a whole number plus a fraction) through gear set 54. Second gear, which further increases the multiplication of pump-motor torque while tending to decrease further the displacement thereof necessary to satisfy a given torque request, involves reversing the positions which the valves 114 and 116 occupied in third gear, i.e. by moving valve 114 to the right while moving valve 116 to the left. This transfers the gear reduction from gear set 54 to gear set 56, gear set 56 being designed to produce a greater multiplication of torque than does gear set 54. First gear, which produces the greatest multiplication of torque and thereby minimizes the displacement required of pump-motor 42 to satisfy any given torque request, is obtained by moving both valves 114 and 116 to the left as seen in FIG. 4 such that compound gear reductions are obtained through both gear sets 54 and 56 simultaneously. Reverse gear would normally be provided only in one ratio (approximately the same as the first gear ratio), i.e. by actuating valve 126 to apply the brake 58c to cage 58a while releasing the cage from the ring gear 58b, by moving valve 114 to the left to provide added gear reduction through gear set 54 and by moving valve 116 to the right to provide direct drive through gear set 56. A controller-regulated "park" gear condition is also provided which combines first gear with the actuation of valve 126 to actuate reverse gear set 58, thereby providing a triple compound gear reduction. Operator controlled switches 127a and b determine whether the transmission is in a forward gear or reverse gear respectively in both stored energy drive mode and engine direct drive mode.

The controller 80 contains stored information with respect to the torque output obtainable from the pump-motor 42 under the assumptions that (1) the pump-motor 42 is at maximum displacement and (2) the pressure of the fluid within accumulators 70 is the minimum to which such pressure is permitted to fall as explained hereafter. The controller also contains stored information regarding the various torque multipliers provided by the above-described various gear selections available. The controller therefore proceeds through a straight-forward logic process, indicated by the logic flow diagrams of FIGS. 7 and 7A, to determine which is the highest gear selection capable of producing the requested positive wheel torque magnitude based on the foregoing assumptions. This gear is selected unless it is such a low gear that the rotational speed of the pump-motor 42 would have to exceed a predetermined safe design limit at the present speed of the vehicle (as sensed through the aforementioned sensors 94a and 94b), in which case a higher gear must be selected even though it may result in a wheel torque less than that requested by the operator.

Figure 8:
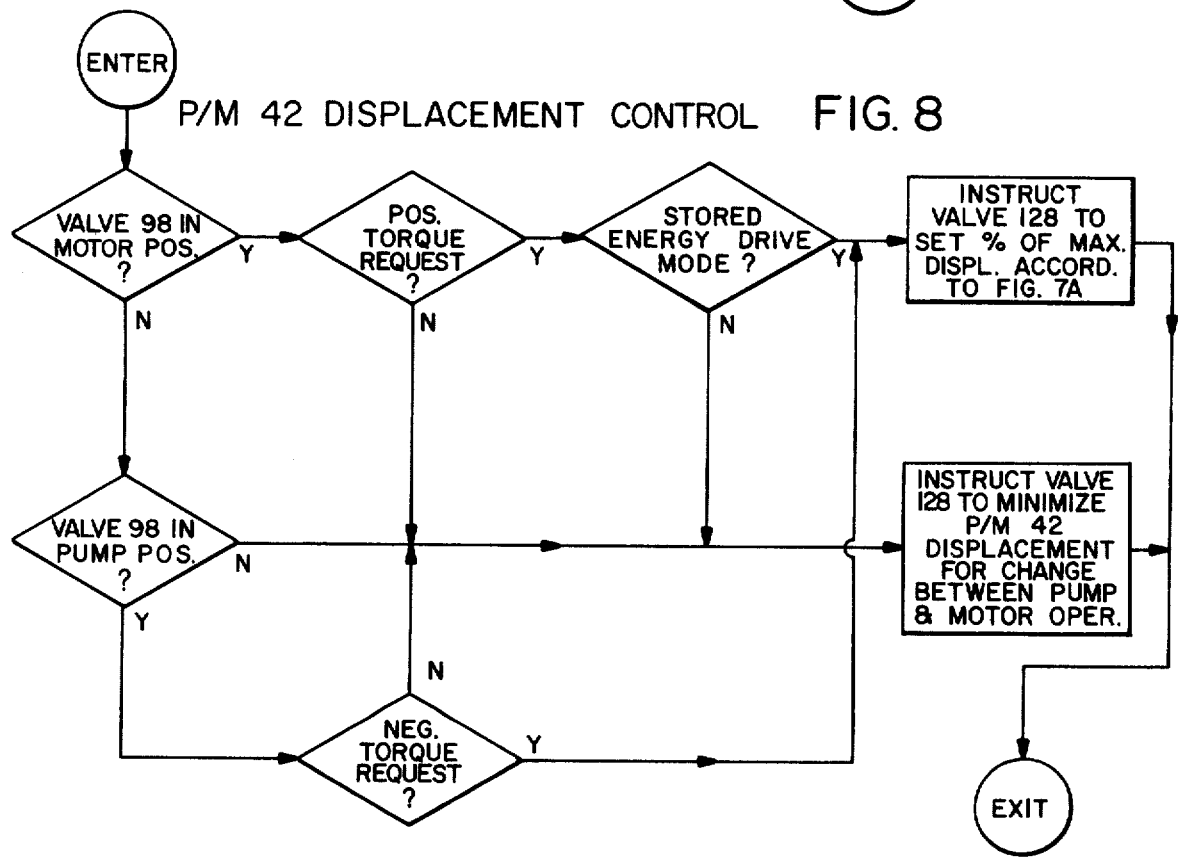

The controller 80 then determines the displacement of the pump-motor 42. The operator's torque request is increased proportionately if a gear other than first or reverse gear has been selected. Then the controller senses the actual level of energy available in the accumulators 70 by means of a suitable energy sensor, such as pressure sensor 130, and reduces the operator's torque request proportionately if actual accumulator pressure is higher than the minimum. The controller then quantifies the operator's requested positive torque magnitude, as adjusted for gear selection and actual accumulator pressure, as a percentage of the torque obtainable from the pump-motor 42 at maximum displacement and minimum accumulator pressure, and causes valve 128 to adjust the displacement of pump-motor 42 to the same percentage of maximum displacement in accordance with the positive torque portion of the logic flow diagram of FIG. 8.

The prevention of energy-wasting wheel slip or wheel spin in response to the operator's positive torque request is accomplished by automatic reduction of the operator's positive torque request (thereby causing a corresponding reduction of the displacement of pump-motor 42) to the extent necessary to prevent such wheel spin. The controller 80 senses the presence or absence of wheel spin by a comparison of the rotational speeds of a driven (rear) and nondriven (front) wheel as shown in FIG. 5. Since turning of the vehicle produces a difference between front and rear wheel speeds attributable solely to such turning, and since the greater difference between front and rear wheel speeds occurs with respect to wheels on opposite sides of the vehicle rather than on the same side, the preferred comparison is between front and rear wheels on opposite sides of the vehicle because the larger difference attributable to turning enables a more accurate correction for such turning. For example the controller would compare the rotational wheel speeds sensed by sensors 94a and 134b, or compare the wheel speeds sensed by sensors 94b and 134a respectively, depending on the turning direction as sensed by potentiometer 135 in accordance with the logic flow diagram of FIG. 5. The magnitude of the difference in wheel speeds, expressed as a percentage, is then reduced by the variable percentage difference attributable to the degree of turning, also sensed by the potentiometer 135. If the remaining percentage difference exceeds a predetermined value, such as 2%, wasteful wheel spin is indicated and the controller 80 momentarily reduces the magnitude of the operator's torque request by a predetermined amount, such as one-half. Moreover, if this reduction of the operator's torque request is insufficient to stop the wheel spin, this fact will be sensed by the controller 80 and, pursuant to FIG. 5, the original torque request will be even further reduced (e.g. again reduced by one-half to one-fourth of the operator's original torque request) by recycling the torque request through the torque reduction portion of FIG. 5. This recycling of the torque request is repeated if wheel spinning persists and can potentially reduce the torque request rapidly to an infinitesimal amount if the spinning does not stop.

Negative Torque Requests

Operator negative torque requests are sensed to some extent also by the degree of depression by the operator of the accelerator pedal 90 as indicated in FIG. 5, in this case the degree of difference being a negative one due to the fact that the speed indicated by the degree of depression of the accelerator 90 is less than the actual speed of the vehicle as sensed through the speed sensors 94a and 94b. The degree of negative difference is likewise considered by the controller to be proportional to the amount of negative torque desired by the operator. Any such negative difference causes the controller 80 to shift solenoid valve 96 to the right as seen in FIG. 4 in accordance with the logic flow diagram of FIG. 6, thereby shifting valve 98 also to the right by the introduction of pilot pressure through pilot line 102 and the exhausting of pilot pressure through pilot line 100. The movement of valve 98 to the right allows the introduction of hydraulic fluid from reservoirs 76 through conduits 112 and 110 to the inlet of pump-motor 42. Simultaneously valve 98 connects the outlet of pump-motor 42 through conduit 108 to the hydraulic accumulators 70. Accordingly pump-motor 42 is now driven as a pump by wheels 84 through shafts 22 and 38, clutch 40 and chain 44.

As indicated in FIG. 5, the degree of negative torque obtainable by fully releasing the accelerator 90 is limited to a relatively small percentage of the total negative torque which the system is capable of imposing on the wheels 84 to decelerate the vehicle. The great majority of negative torque of which the system is capable, however, will be supplied not in response to release of the accelerator pedal 90 but rather in response to depression of the vehicle brake pedal 136. In the latter case, the degree of negative torque requested by the operator is sensed by the controller 80 through a variable potentiometer 138 responsive to the degree of depression of the brake pedal 136. In this case no comparison is made between degree of brake pedal depression and speed of the vehicle. Rather the amount of negative torque request is simply regarded by the controller as being proportional to the degree of depression of the brake pedal 136.

In providing the negative torque requested by the operator, either through release of the accelerator or depression of the brake pedal, the same limiting factors regarding optimizing efficiency, i.e. maximizing the displacement of the pump-motor 42 and preventing any slipping or skidding of the wheels 84 with respect to the road surface are applied. Since an objective of the drive system is to collect and store in the accumulators 70 the energy normally lost in braking or decelerating the vehicle, and since such collection is accomplished by driving the pump-motor 42 as a pump, operating the pump-motor at its maximum displacement consistent with the magnitude of negative torque requests is desirable for efficiency reasons. Moreover any skidding of the wheels 84 by the application of excess negative torque wastes deceleration energy which might otherwise have been collected and stored.

The controller 80 contains stored information with respect to the negative torque which can be imposed by the pump-motor 42 at its maximum displacement when driven as a pump to charge the accumulators 70 at their minimum pressure. The controller therefore proceeds through the same logic process as already discussed with respect to FIGS. 7 and 7A to determine which is the highest gear selection capable of producing the requested negative torque at maximum pump-motor displacement and minimum accumulator pressure, and adjusts such determination to an even higher gear if excessive speed of pump-motor 42 would result at present vehicle speed. This gear is selected and the controller 80 then sets the displacement of the pump-motor 42 by modulation of the valve 128 in accordance with FIG. 8 to the displacement which will satisfy the negative torque requested by the operator in the same manner as previously described with respect to positive torque requests. Moreover the prevention of wheel skid by reducing the magnitude of the negative torque request in response to skidding is also carried out in a manner similar to that described for positive torque requests. Conventional mechanical brakes operated by a hydraulic brake cylinder such as 140 are provided as a backup to the above-described regenerative deceleration system, but are applied only near the extreme depressed position of the brake pedal 136 so as to maximize the energy collected and stored in the accumulators 70 from the deceleration process.

It should be noted that during charging of the accumulators 70, accumulator 74 will also be charged through conduits 151 and 152 as long as the pressure in accumulator 74 is not greater than the pressure in accumulators 70. (Accumulator 74 is sometimes at a greater pressure because checkvalve 154 protects accumulator 74 from satisfying the same demands as accumulators 70). Any overcharging of the main accumulator circuit to a pressure in excess of a maximum safety level due to high negative torque requests coupled with a relatively high vehicle speed from which to decelerate is prevented by a pressure relief valve 184. However, because such pressure relief would be wasteful of valuable braking or deceleration energy, the system includes means for minimizing the need for such relief which will be explained hereafter.

Engine Operation

During operation of the drive system in the stored energy drive mode, the engine 12 is used neither to accelerate nor decelerate the vehicle. Rather the engine is used solely to charge the accumulators 70 as needed. Because of this, running of the engine might not be needed for substantial periods of time while the vehicle is being accelerated and decelerated (depending on the magnitude and frequency of positive and negative torque requests) thereby adding significantly to fuel savings by virtue of engine stoppage.

Starting of the engine 12 during operation of the vehicle in the stored energy drive mode will occur only in response to either of two factors. First, regardless of whether or not the accumulators 70 need charging, the engine 12 will be started automatically upon closing of the operator keyswitch 106 if the controller 80 senses that the engine is cold due to prolonged stoppage, such as overnight. The controller 80 senses engine temperature through a conventional temperature sensor 142. Accordingly, if engine temperature as transmitted to the controller 80 by temperature sensor 142 is below a predetermined temperature (for example 75° F.) the controller 80 will automatically start the engine 12 in the manner to be described more fully hereafter in accordance with FIG. 9 and will allow the engine 12 to idle at no load until either a predetermined warm-up temperature (for example 150° F.) is reached (in which case the engine is then stopped by the controller if not needed) or until the engine is needed for other purposes. The reason for automatic engine starting for warm-up purposes, even though the engine is not otherwise needed, is to ensure that engine power will be available when eventually it is needed and to minimize emissions while operating the vehicle. This is also the reason why, as indicated in FIG. 9, the controller 80 is prevented from causing any propulsion of the vehicle if a cold engine cannot be started.

Other than for engine warm-up purposes, the engine 12 will be started, while the drive system remains in the stored energy drive mode and the key switch 106 is closed, only in response to a drop in the energy stored in the accumulators 70 to a predetermined value (i.e. to a predetermined minimum accumulator pressure as sensed by pressure sensor 130). Such predetermined minimum accumulator pressure will be sufficient to enable some further acceleration of the vehicle solely from hydraulic fluid stored in the accumulators, and therefore does not represent a fully exhausted condition of the accumulators 70 but rather a safe lower limit to ensure continuous reliable satisfaction of positive torque requests.

Automatic starting of the engine 12 in response to minimum accumulator pressure as sensed by the controller 80 through pressure sensor 130 is accomplished by the controller 80 in accordance with the logic flow diagram shown in FIG. 9. Assuming that the drive system is in the stored energy drive mode, and that the pressure level in the accumulators 70 has dropped to the predetermined minimum pressure, the controller 80 first determines whether the engine 12 is already running by sensing engine speed through sensor 144 responsive to the rotational speed of transmission input shaft 18 (FIG. 4). Assuming that the engine is not running, the controller 80 actuates valve 146 as shown in FIG. 10 to apply engaging pressure to clutch assembly 24 so as to permit shaft 18 to be driven through sprocket 30 and chain 28 by pump-motor 26. (Controller 80 can either maintain valve 146 in its actuated condition and clutch 24 in its engaged condition as shown in FIG. 10 whenever the engine 12 is not running or, alternatively, can actuate valve 146 only in response to a need for clutch engagement if it is desired to conserve the electrical current needed for actuating valve 146).

The controller 80 then actuates valve 150 in accordance with FIG. 9 to permit the flow of fluid from accumulator 74 (which has been previously charged in conjunction with the charging of accumulators 70 through conduits 151 and 152 but whose pressure depletion during the discharge of fluid from accumulators 70 to accelerate the vehicle has been prevented by means of checkvalve 154). Pressurized fluid from accumulator 74 is thereby admitted through actuated valve 150 and conduit 156 to the inlet of pump-motor 26 so as to drive it as an engine starter motor, fluid being exhausted from the outlet of pump-motor 26 through simultaneously actuated valve 158 and conduit 160 to reservoirs 76. This causes pump-motor 26, acting as a motor, to drive engine 12 through shaft 18 to start it. Whenever the engine is not running controller 80, acting through valve 148 in accordance with FIG. 11, has maintained pump-motor 26 at maximum displacement in preparation for obtaining maximum torque output therefrom when driven as a motor. Thus maximum starting torque is immediately available.

Controller 80, substantially simultaneously with its actuation of valves 150 and 158, closes relay-operated ignition switch 162 FIG. 4 in accordance with FIG. 9, thereby supplying the needed spark through ignition coil 163, and engine 12 is thereby started. Controller 80 senses that the engine 12 has started by sensing the speed of input shaft 18 through sensor 144. Accordingly, as soon as engine speed has reached a predetermined minimum level such as 500 rpm, and sufficient intake manifold vacuum has been established as sensed by vacuum sensor 188, controller 80 deactivates valves 150 and 158 according to FIG. 9 to prevent any further use of energy in the accumulator 74. The pump-motor 26 therefore no longer drives the engine as a starter motor, but rather is now driven as a pump by the engine and converts to pumping mode drawing fluid from the reservoirs 76 through conduit 160 and exhausting fluid through conduits 164 and 151 to charge the accumulators 70.

During the charging of the accumulators 70, engine speed and pump displacement are regulated by the controller 80. Engine speed is governed by the controller's regulation of an electric motor 186 which regulates the engine throttle 187 to maintain a predetermined engine speed as sensed by sensor 144. Simultaneously, the controller 80 regulates the displacement of pump-motor 26 through its regulation of valve 148 in response to intake manifold vacuum level, as sensed by vacuum sensor 188, so as to stabilize such manifold vacuum at a predetermined level. Manifold vacuum is actually used here as an indication of engine output torque, so that the stabilization of the vacuum level in effect stabilizes the output torque of the engine during charging of the accumulators.

The reason why engine speed and output torque are stabilized at predetermined levels during such charging is fuel economy. As shown in FIG. 15, an engine rating graph wherein engine horsepower and output torque are plotted against engine speed at full throttle can be drawn for any particular internal combustion engine. It is known that any given engine obtains its best fuel economy within a particular portion of its torque range, such range varying from engine to engine and being plotted from the so-called brake specific fuel consumption curve for the engine. In FIG. 15, this range is indicated as that portion of the torque curve between points A and B. To pick the specific point within this range where the engine should be operated for best efficiency, the point C of maximum torque which falls within the engine speed range of points A and B is located as shown in the exemplary graph of FIG. 15. This point C thus determines the governed speed and output torque magnitude (the latter coinciding with a particular manifold vacuum value) at which the engine 12 should be operated for maximum efficiency during its driving of the pump-motor 26 to charge the accumulators. These predetermined governed speed and manifold vacuum values are stored in the controller 80, which functions through regulation of throttle control motor 186 in accordance with FIG. 12 and displacement control valve 148 in accordance with FIG. 11 to maintain these desired values while the engine 12 is charging the accumulators 70. In this connection the controller 80 receives throttle position and displacement position feedbacks through potentiometers 190 and 192 respectively.

Engine running in response to low accumulator pressure so as to charge the accumulators 70 is not necessarily limited to those times when the operator keyswitch 106 is closed or accumulator valve 104 is open. The opening of the keyswitch 106 and resultant closure of valve 104 does not prevent the introduction of fluid into the accumulators 70 through conduit 194 and checkvalve 196. Moreover, although the closing of keyswitch 106 is necessary to initially energize the controller 80, a controller-actuated relay 109 shunting keyswitch 106 keeps the controller 80 energized after opening of the keyswitch until the relay 109 is deactivated by the controller 80 pursuant to FIG. 9. Accordingly the opening of keyswitch 106 merely begins a cycle as shown in FIG. 9 whereby, if the accumulators 70 are not fully charged, the engine 12 can start running and/or continue running, charging the accumulators 70 until maximum accumulator pressure is reached even if the vehicle has been parked and left unattended. This serves to charge the accumulators 70 fully in the manner just described in preparation for the next use of the vehicle.

Stopping of the engine when it is being used to charge the accumulators 70 is automatically controlled by the controller 80 in response to the energy level in the accumulators 70 reaching a predetermined maximum value, i.e. reaching a predetermined maximum pressure level as sensed by pressure sensor 130. Instead of the predetermined maximum pressure level being a constant value however, it is a variable value which decreases as vehicle speed, sensed through one of the sensors 94a or 94b, increases. The objective in decreasing the pressure level to which the engine 12 is permitted to charge the accumulators 70 as vehicle speed increases is to enable the accumulators 70 to collect and store more deceleration energy as vehicle speed increases, since the vehicle's capability to generate deceleration energy increases with increased speed. If the maximum pressure to which the engine 12 is permitted to charge the accumulators 70 were not decreased with increased vehicle speed, deceleration of the vehicle from higher speeds would produce deceleration energy (collected by the drive system by the driving of pump-motor 42 as a pump in response to negative torque rquests as previously described) in excess of that which can safely be stored in the accumulators 70. This then would force the excess energy to be wasted by relief of hydraulic fluid through relief valve 184 to reservoirs 76, thereby partially defeating one of the energy-saving objectives of the drive system. Accordingly the controller 80 uses a stored maximum accumulator pressure value (e.g. relief pressure) to limit engine charging of the accumulators when the vehicle is motionless, and all other maximum pressure values applied by the controller to limit engine charging when the vehicle is in motion decrease therefrom in generally inverse proportion to vehicle speed. These variable predetermined maximum pressure values determine when the accumulators 70 are fully charged and therefore when the engine should be stopped to cease charging by opening of ignition switch 162 in accordance with FIG. 12. The result is a minimum of redundancy between the use of engine-generated energy and deceleration-generated energy to drive the vehicle, which minimizes the use of the engine 12 and thereby maximizes fuel economy.

According to the engine stopping cycle of FIG. 12, the controller 80 permits the engine 12 to continue charging the accumulators 70, by driving pump-motor 26 as a pump, until the particular predetermined maximum pressure value corresponding to the speed of the vehicle is reached. At this time the controller acting through throttle control motor 186 reduces the throttle setting to permit the engine to idle, disengages clutch 24 pursuant to FIG. 10, senses through temperature sensor 142 whether the engine is warm enough to be permitted to stop and, if so, opens switch 162 thereby interrupting the ignition and stopping the engine. In accordance with FIG. 11, stopping of the engine 12 also returns the displacement of pump-motor 26 to maximum through regulation of valve 148 in anticipation of the next need for starting the engine.

It should be understood that the above-described variable maximum accumulator pressure values which determine the extent to which the engine may charge the accumulators 70 do not likewise limit the extent to which the accumulators can be charged by negative torque requests. Accordingly it is possible for the accumulator pressure to exceed the variable maximum value as a result of negative torque requests whenever the vehicle is in motion.

ENGINE DIRECT DRIVE MODE

In this mode of operation the engine 12 is running pursuant to criteria to be discussed hereafter, clutch assembly 36 is engaged by actuation of valve 86 so that torque may be transmitted from the engine 12 to shaft 38, and clutch assembly 40 is disengaged by the deactivation of valve 88 so that no torque can be transmitted between shaft 38 and pump-motor 42. Clutch 24 is disengaged by the deactivation of valve 146 so that the engine 12 cannot charge the accumulators 70, pump-motor 42 is held at minimum displacement in anticipation of negative torque requests, valve 98 is centered and, since the engine is running, pump-motor 26 is held at minimum displacement in anticipation of being called upon to charge the accumulators 70 (rather than at maximum displacement in anticipation of being required to start the engine 12).

Positive Torque Requests

Operator positive torque requests in the engine direct drive mode are sensed in the same manner as previously described with respect to the stored energy drive mode and as shown in the logic flow diagram of FIG. 5. The positive torque request is entered in the logic flow diagram of FIG. 7 and the controller 80 begins to proceed through the same logic process as already discussed with respect to FIGS. 7 and 7A to determine which is the highest gear selection capable of producing the requested positive torque at the maximum displacement of pump-motor 42 and the minimum pressure of accumulators 70. (The controller 80 can conveniently use the torque output of the pump-motor 42 at maximum displacement and minimum accumulator pressure as the standard, even though the drive system is in engine direct drive mode, because the pump-motor 42 and minimum accumulator pressure have been conveniently selected so as to provide, at maximum pump-motor displacement, a torque substantially equal to the maximum torque obtainable from the engine 12. This simplifies the task of the controller 80, although if the pump-motor 42 and engine 12 were not so matched it would of course be possible to store other torque output information in the controller 80 to use as the standard in the engine direct drive gear selection process.) Thereafter the controller adjusts the foregoing highest gear determination to an even higher gear if excessive input speed, this time of the engine, would result (here again the maximum predetermined desired operation speeds of the pump-motor 42 and engine 12 are set at the same value for simplicity).

The logic process differs from that employed in the stored energy drive mode, however, in that a further determination must be made before a gear is selected for the direct drive mode. This determination, as shown in FIG. 7A, adjusts the previous highest gear determination to a lower gear if too low an engine speed (such as to cause stalling of the engine) would result. The gear determined by these three tests is then selected and the controller 80 increases the operator's requested torque proportionately if a gear other than first or reverse have been selected. The controller quantifies the operator's requested positive torque magnitude, as adjusted for gear selection, as a percentage of the maximum torque obtainable from the engine 12 (i.e. conveniently the same as the torque obtainable from the pump-motor 42 at maximum displacement and minimum accumulator pressure), and causes throttle control motor 186 to adjust the opening of the throttle proportionately to its maximum open position in accordance with the logic flow diagram of FIG. 12.

Negative Torque Requests

Negative torque requests are satisfied only in the stored energy drive mode of the system. Overrunning clutch 34 prevents the transmission of deceleration torque from shaft 38 to shaft 18 which would otherwise drive the engine 12 under compression but waste deceleration energy. Thus all negative torque requests cause the controller 80 to change the system from engine direct drive mode to stored energy drive mode and to function as previously described with respect to the satisfaction of negative torque requests in the stored energy drive mode.

Because the change from engine direct drive mode to stored energy drive mode in response to the operator's change from a positive to a negative torque request is merely a special case of a transfer between the two drive modes, a discussion of the operation of the clutches 36 and 40 and of engine control as a result of such transfer will be covered more fully in connection with the following general discussion of transfer between the two modes.

TRANSFER BETWEEN STORED ENERGY DRIVE MODE AND ENGINE DIRECT DRIVE MODE

Figure 13:
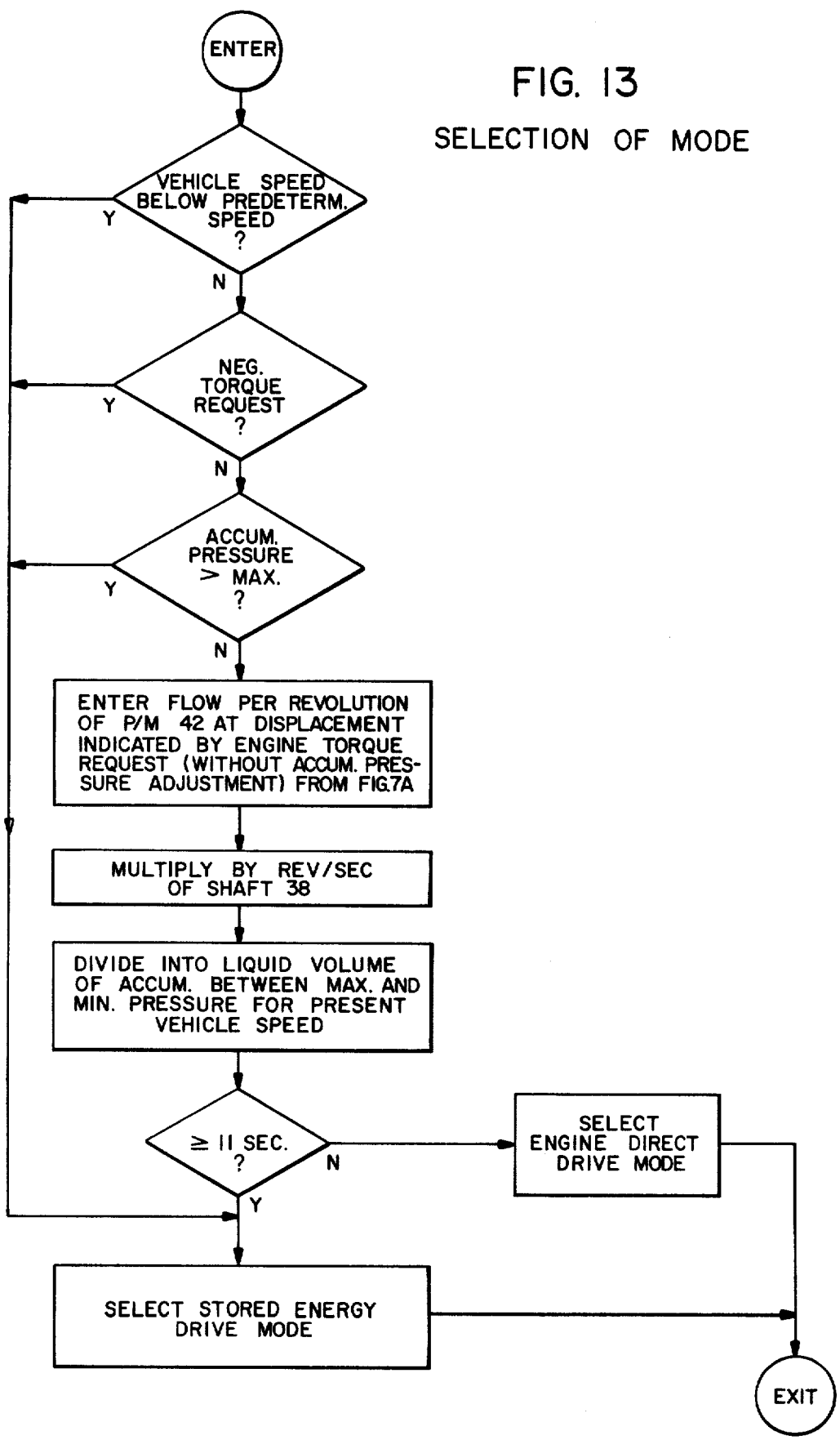

During the operation of the drive system it will transfer from stored energy drive mode to engine direct drive mode, and vice versa, automatically in response to certain criteria. The criteria are set forth in the logic flow diagram of FIG. 13, representing a continuous repetitive decision-making process employed by the controller 80 to determine which drive mode should be employed under current operating conditions. This decision affects other relevant logic processes of the controller 80, answering the question "stored energy drive mode?" (yes or no) appearing in FIGS. 6, 7A, 8, 9, 10, 11, 12 and 14.

As shown in FIG. 13 there are three overriding considerations, any one of which will dictate that the vehicle be in the stored energy drive mode. These are:

1. vehicle speed below a predetermined minimum speed (such as 10 miles per hour); or
2. a negative torque request; or
3. pressure of fluid in accumulators 70 greater than the maximum engine charging pressure for the particular vehicle speed (to insure that such excess energy will be used to thereby leave sufficient room for the storing of anticipated deceleration energy).

If none of the above three factors exists, the basic determination governing mode selection is whether, if the system were in the stored energy drive mode, the volumetric use rate of hydraulic fluid through the pump-motor 42 would deplete the accumulators 70, within a predetermined period of time (e.g. eleven seconds as shown in FIG. 13), from the maximum pressure to which they could be charged by the engine down to their minimum allowable pressure. The potential volumetric use rate is known to the controller, regardless of the mode of the system, because the speed of shaft 38 (and thus the potential or actual speed of pump-motor 42) is sensed through sensor 204 (FIG. 4), and the displacement of pump-motor 42 (potential or actual) is known through the operator's torque request magnitude as adjusted according to FIGS. 7 and 7A (except that no adjustment for actual accumulator pressure is included). The controller 80 contains stored information regarding the volumetric flow per revolution through the pump-motor 42 at a predetermined displacement; accordingly it is a straightforward matter for the controller 80 to proportionately calculate the flow per revolution at any other displacement dictated by the adjusted torque request magnitude and to multiply this flow by the revolutions per second of the shaft 38 to obtain a potential flow rate as shown in FIG. 13. Likewise the controller 80 contains stored information regarding the fluid volume differential in the accumulators 70 between minimum accumulator pressure and maximum engine charging pressure. Accordingly, by dividing this fluid volume differential by the potential flow rate through pump-motor 42, the controller 80 knows whether the potential volumetric flow rate under the existing conditions would expend the fluid volume differential in the accumulators within the aforementioned predetermined period of time. If so this would mean that, if the system were in the stored energy drive mode, the time lapse between stopping of the engine 12 upon full charging of the accumulators and starting of the engine in response to minimum accumulator pressure would be within that same short time period.

Despite the fuel-saving efficiency of running the engine 12 at governed speed and governed output torque during charging of the accumulators 70 as previously described, such economy would be offset by the energy lost in such frequent stopping and starting of the engine 12. Moreover, the acceptability of the exhaust emissions from the engine would likewise be adversely affected because of the poor fuel combustion conditions required for starting. Accordingly, if such frequent engine starting would be required it would be better, for both efficiency and environmental reasons, to run the engine continuously in the engine direct drive mode. This determination is made repeatedly in rapid cyclic fashion by the controller 80 during vehicle operation in accordance with FIG. 13, thereby dictating whether the drive system will remain in its present mode or transfer to the opposite mode.

In general, it can be said that the foregoing frequency of starting criterion for mode selection, since it is based on the rate of usage of stored energy, will dictate the selection of the stored energy drive mode when vehicle speed and/or positive torque requests are relatively moderate, and will dictate the selection of the engine direct drive mode when vehicle speed and/or positive torque requests are higher.

Upon transfer from stored energy drive mode to engine direct drive mode, the engine must be started in accordance with FIG. 9 if it is not already running. Conversely, upon a transfer from engine direct drive mode to stored energy drive mode (for whatever reason), the engine is already running and is either permitted to continue to run or is stopped in accordance with the criteria of FIG. 12. If stopped, it is restarted only in accordance with FIG. 9.

Figure 14:
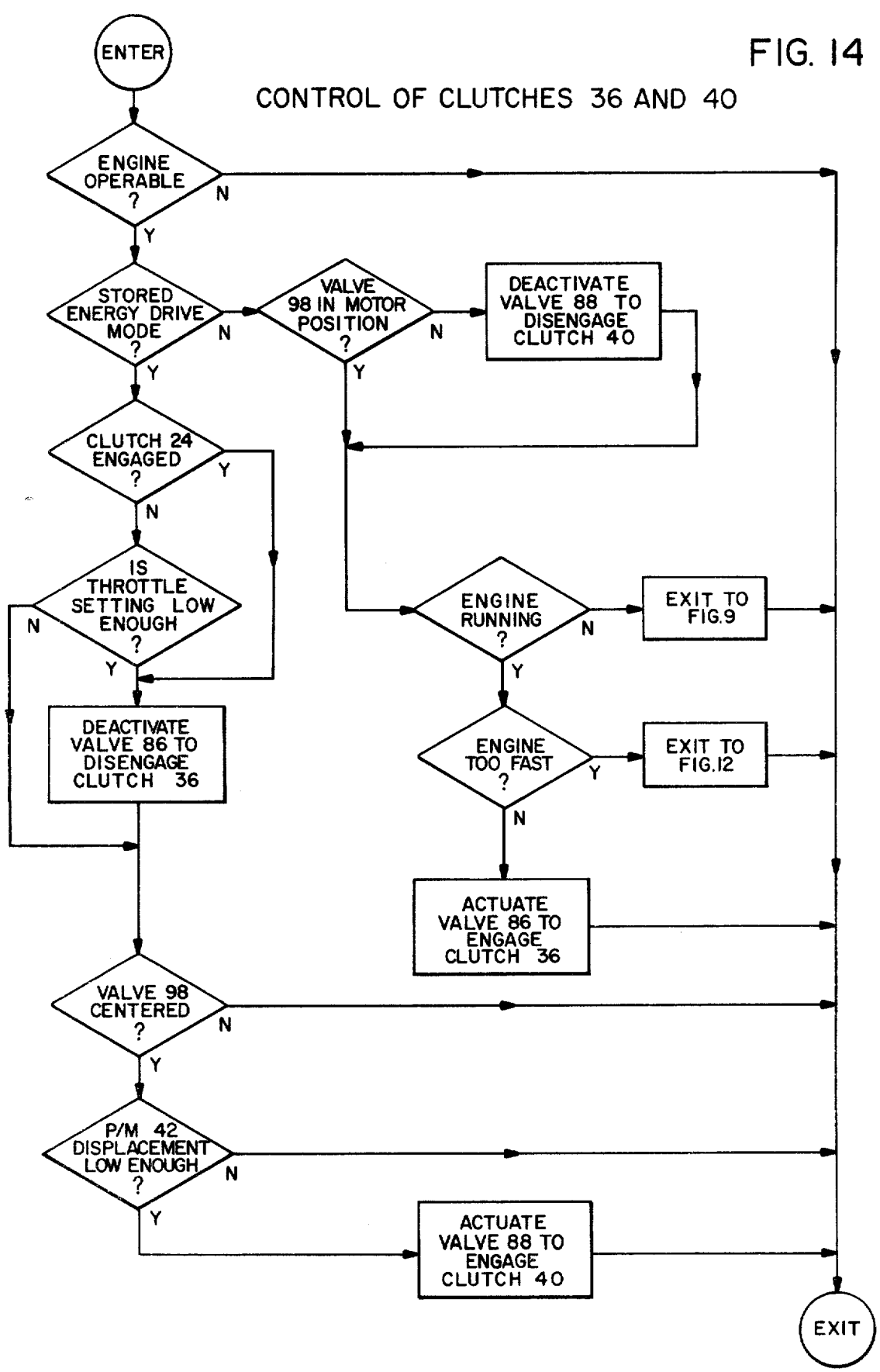

As seen in FIGS. 6 through 11, the position of valve 98, the method of gear selection and quantifying of torque requests, the displacement control of pump-motor 42, engine starting, the engagement of clutch 24 and the displacement control of pump-motor 26 respectively are all dependent upon drive mode selection pursuant to FIG. 13. Moreover, according to FIG. 12, the control of the engine throttle is likewise so dependent, governing engine speed in the stored energy drive mode during charging of the accumulators and variably regulating the throttle in response to positive torque requests during the engine direct mode. Finally, as indicated in FIG. 14, the engagement of clutches 36 and 40 are of course also dependent upon drive mode selection, clutch 36 generally being released and clutch 40 engaged in response to the selection of stored energy drive mode, and clutch 36 being engaged and clutch 40 being released in response to engine direct drive mode.

However the manner in which these clutches are engaged and disengaged to ensure smooth operation during the transfer from one mode to another is worthy of mention. In the transition from engine direct drive to stored energy drive (to satisfy either positive or negative torque requests) the disengagement of clutch 36 does not necessarily occur simultaneously with the engagement of clutch 40. As shown in FIG. 14, the disengagement of clutch 36 does not occur until either the engine throttle setting is low enough so that the disengagement of clutch 36 will not overspeed the engine, or clutch 24 is engaged so as to load the engine thereby also preventing overspeeding. The engagement of clutch 40, on the other hand, is not dependent upon such criteria but rather upon the condition of pump-motor 42. Valve 98 is already centered (pursuant to FIG. 6) in anticipation of operating pump-motor 42 either as a motor or a pump depending upon whether the operator's torque request is positive or negative. Moreover pump-motor 42 is in its condition of minimum displacement pursuant to FIG. 8 so that torque may be applied from or to it gradually upon the engagement of clutch 40. Without these precautions, the engagement of clutch 40 might cause an undesirable jerk as either positive or negative torque is applied through the pump-motor 42. It will be appreciated that, particularly when the request for negative torque causes the transition from engine direct drive mode to stored energy drive mode, the overrunning clutch 34 is very useful in permitting the immediate engagement of clutch 40 without requiring the immediate simultaneous disengagement of clutch 36 to prevent the wasting of deceleration energy by the wheels driving the engine 12.

In the opposite transition, i.e. from stored energy drive mode to direct engine drive mode (which will occur only in response to positive torque requests under certain conditions as discussed previously), the disengagement of clutch 40 will not necessarily occur simultaneously with the engagement of clutch 36. The disengagement of clutch 40, as indicated in FIG. 14, is dependent upon valve 98 no longer maintaining pump-motor 42 in its motor condition since, in its motor condition, the disengagement of clutch 40 would unload pump-motor 42 and cause overspeeding thereof. Conversely, the engagement of clutch 36 is first dependent upon whether the engine 12 is running. If not, the engine must be started pursuant to FIG. 9. Next the engine must not be running at too high a speed relative to shaft 38 or its momentum will cause a positive torque jerk upon the engagement of clutch 36. It should be noted that if the engine is running at a lower speed than shaft 38, no negative torque jerk will occur due to the presence of overrunning clutch 34. Accordingly the maximum engine speed permissible for engagement of clutch 36 can be set quite low, due to the prevention of any negative torque jerk by overrunning clutch 34, and might be set for example at idle speed. Thus, if the engine is running above such permissible speed, clutch 36 will not be engaged as shown in FIG. 14 and, pursuant to FIG. 12, the throttle will be reduced to produce the desired low engine speed. Thereafter the clutch 36 is engaged pursuant to FIG. 14, after which the engine throttle is set according to the operator's torque request according to FIG. 12, which immediately brings the engine up to the same speed as shaft 38 so that positive torque can be applied through overrunning clutch 34.

If the foregoing sequence of events for engagement of clutch 36 should, in some applications of the drive system, cause an unacceptable delay in the application of positive torque, the controller 80 could alternatively, by sensing engine speed and shaft 38 speed through sensors 144 and 204 respectively, control the throttle such that the speeds of the engine and shaft 38 are precisely matched as a prerequisite to engagement of clutch 36. This would require a more complex function of the controller 80 however, and would be employed only if required by the needs of the particular vehicle.

EMERGENCY DRIVE MODE

Incapacitation of any of the major drive system components utilized in the stored energy drive mode, such as through hydraulic leakage resulting from a ruptured conduit, would make it impossible to utilize such mode. Yet, particularly if the vehicle is of the commercial, industrial or military type, it is important that the vehicle remain drivable. In such case actuation of any one of the emergency switches 206 (FIG. 4) *a, b, c, d* or *e* (which correspond to the four forward and one reverse gears respectively), acting through relay assembly 208, will disable the controller 80 and directly cause the disengagement of clutches 24 and 40, the engagement of clutch 36, and the actuation of the selected gear through the operation of the appropriate gear set control valves 114, 116 and 126 so as to create a direct drive from the engine 12 to the wheels 84. In addition, the actuation of any one of the switches 206*a, b, c, d* or *e* establishes a direct mechanical link between the accelerator pedal 80 and the engine throttle 187, bypassing the throttle motor 186. This link is established by the actuation, through relay assembly 208, of solenoid pin 200 to lock an otherwise loose sliding mechanical coupling 202 such that the accelerator pedal 90 controls the throttle by a conventional direct mechanical connection.

In the emergency mode of operation there must be some means of removing and gradually variably imposing a torque load with respect to the engine 12 to prevent stalling of the engine. This can be provided by modulated slippage of the clutches and bands in the gear sets, and by placing the gear sets 54 and 56 in neutral by centering of valves 114 and 116 in response to depression of the brake pedal 136. Alternatively, the same result can be obtained by means of the conventional foot-operated mechanical pressure plate type clutch 20, of the type usually utilized in conjunction with conventional manual transmissions. It should be noted that all of the operator-controlled switches 127*a* and *b* and 206*a, b, c, d* and *e* are preferably pushbutton switches mechanically interconnected by conventional means (not shown) which enables actuation of only one of the switches at any one time so as to avoid the transmission of conflicting signals to the drive system.

THE CONTROLLER

The controller 80 is a logic decision making apparatus which receives information from sensors through-out the drive system and generates control signals for operating the drive system according to a predetermined scheme. While it could conceivably be constructed of mechanical or fluid logic devices, it is preferably constructed from electronic logic components, as they are compact, clean, reliable, readily available for performing a variety of logical functions and are adapted for high-volume production. More specifically, the controller would preferably be constructed as a programmable digital computer having appropriate analog input and output interface circuitry associated therewith so that operation of the drive system could be controlled by programming the computer, thereby readily permitting changes in the operation of the drive system for particular circumstances and improvements in the operation as a consequence of experience with the system. However, it should be recognized that the controller could be constructed from hard-wired logic designed to perform specific control functions.

Figure 16:
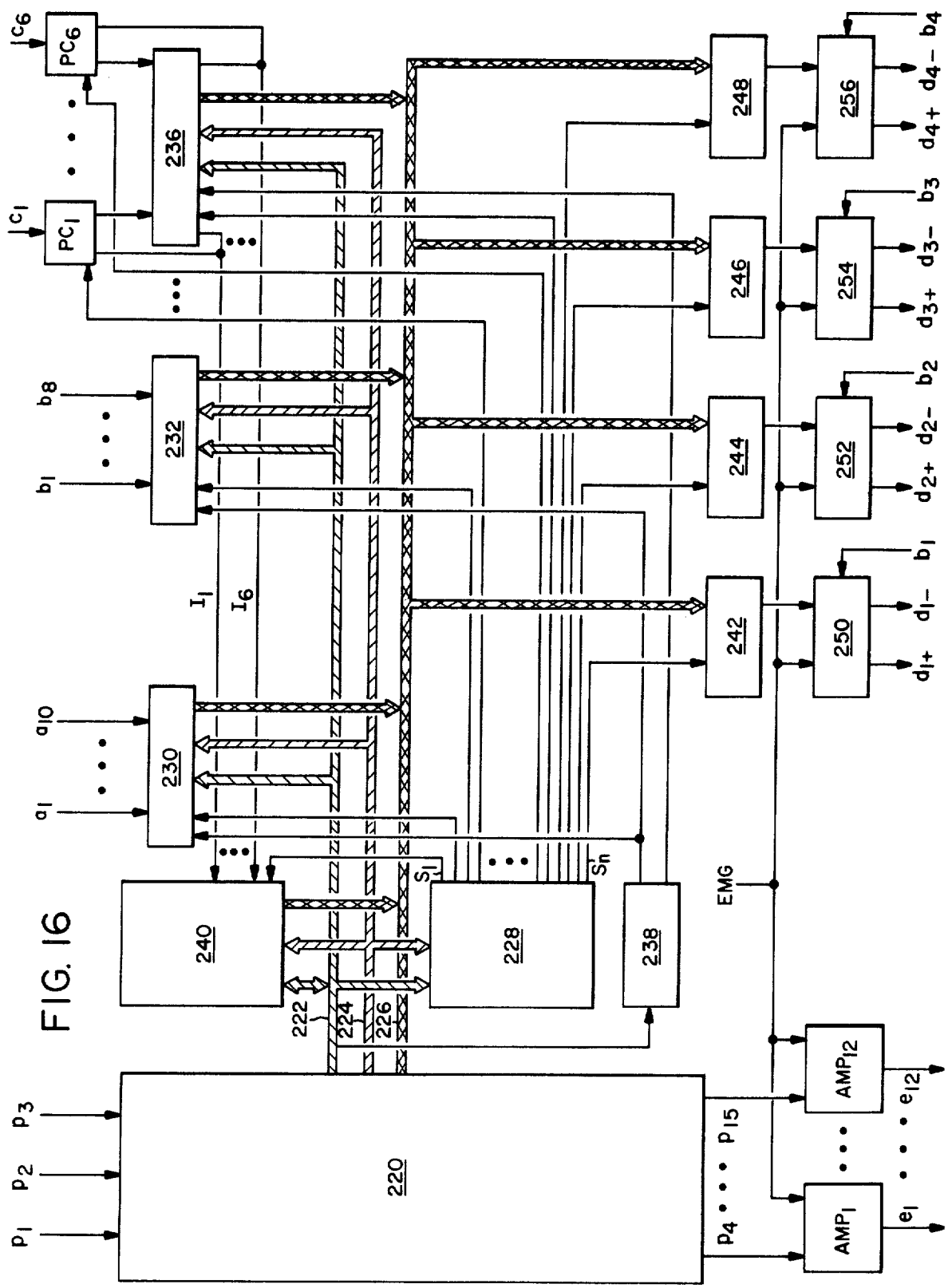
FIG. 16 is a functional block diagram of the digital controller apparatus for controlling the operation of the drive system of the present invention.

Turning to FIG. 16, the controller contemplated for use in the preferred embodiment of the invention is based upon a central processing unit (CPU) 220, having a plurality of input/output (I/O) ports $P_{1-15}$, a control bus 222, an address bus 224, a data bus 226, and input and output circuitry associated therewith. Each of the I/O ports $P_{1-15}$ sends or receives an on/off signal, and each of the three buses comprises a plurality of parallel-bit signal lines for sending or receiving on/off signals as well. The CPU includes a memory made of conventional components for storing a control program and data. It also includes processing circuitry capable of performing conventional logical and arithmetic functions in accordance with the control program, as is commonly understood in the art. While a variety of different devices, or combinations of devices, might be utilized to perform the CPU functions, it is particularly satisfactory to utilize a readily-available microprocessor-based computer having the appropriate I/O ports and control, address, and data buses. One such device which has been found to be suitable when used with an expanded memory is, for example, a programmable digital computer manufactured by Intel Corporation and marketed under the designation SDK 85.

In the controller a number of input signals from the rest of the drive systems are caused to be read, and output signals are caused to be generated, utilizing control signals transmitted by the CPU 220 over the control bus 222 and address signals transmitted over the address bus 224 in response to appropriate computer program instructions. Typically, the CPU transmits signals over the control bus which cause a demultiplexer 228 to read several of the more significant bits of the address bus and generate a "select" signal on one or more select output lines $S_{1-n}$. The select output lines then enable specific logic devices for reading an input signal or generating an output signal. Once selected, an input or output device, as the case may be, may be further controlled by subsequent signals on the control bus, and data may be transmitted to or received from the device over the data bus. The demultiplexer function can be performed utilizing standard demultiplexer components such as, for example, a combination of demultiplexers manufactured by National Semiconductor Corporation and distributed with the designations 74LS138 and 74LS155.

Each of the ten pressure sensor transducers in the drive system, such as the main accumulator pressure sensor 130 or sensors 107a–h in FIG. 4, produces a signal of variable amplitude which must be converted to a digital representation in order to be of use by the CPU in controlling the system. Accordingly, the controller 80 includes an analog-to-digital (A/D) converter 230 having respective inputs $a_{1-10}$ for each of the pressure transducers. When an appropriate instruction is given by the control program, the CPU issues a command over the control bus 222 and a pressure signal input address over the address bus 224. Several of the more significant bits of the address are read by the demultiplexer 228 which enables A/D converter 230 via a select line and several of the less significant bits are read by the enabled A/D converter to select a specific one of the pressure inputs $a_{1-10}$ thereto. The pressure transducer signal supplied to that input is thereafter converted by the A/D converter 230 to a digital representation. In the interim, the CPU may proceed to perform other functions. While a single A/D converter is shown in FIG. 16, it is to be recognized that the function may be performed by one or more of a variety of readily available conventional components such as, for example, A/D converters manufactured by National Semiconductor Corporation and distributed with the designation ADCO 817. The actual number of select lines required depends upon the specific A/D converter components utilized.

Each of the position indicators in the drive system, which as the pump-motor displacement indicator potentiometer 132, and the temperature transducer 142, also generates a variable analog signal which must be converted to a digital representation for use by the CPU in controlling the system. This is accomplished by an A/D converter 232 having inputs $b_{1-8}$ in essentially the same manner as the conversion of pressure signals to digital representation. However, the pressure signals are measured with reference to a different amplitude level than the position and temperature signals, and therefore typically require separate A/D conversion circuitry.

After a predetermined period of time, required for conversion of an analog signal to a digital representation, has elapsed, the CPU 220 may return to either of A/D converters 230 or 232 by issuing a select signal via the demultiplexer 228 and appropriate control signals which cause the enabled A/D converter to write the digital representation of the selected input signal onto the data bus, from which it may be read by the CPU and utilized to control the system.

Each of the speed sensors in the drive system, such as the engine speed sensor 144, produces sequential pulses whose width represent the resolvable instantaneous speed being measured. The speed at any given instant is determined by the controller by measuring the width of the most recent pulse from a given sensor, which is accomplished by counting the number of periodic pulses of a known frequency which occur during the presence of that pulse.

More specifically, each of the six speed sensors provides a signal to one of several one-and-only-one circuits $PC_{1-6}$, having respective inputs $C_{1-6}$. Each such circuit is of a commonly known configuration which, when enabled, permits one, and only one, input pulse to pass therethrough. The respective outputs of the six one-and-only-one circuits comprise the inputs to a timer 236. The timer determines the width of an input pulse by counting periodic clock pulses of a predetermined frequency during the presence of that pulse.

In response to an appropriate instruction in the control program, the CPU 220 issues appropriate control signals over the control bus and an address over the address bus which cause the demultiplexer 228 to enable the timer 236 via one of the select lines $S_{1-n}$ and, within the timer, specific timing circuitry corresponding to the speed input signal to be examined. Some of the more significant bits of the address bus are utilized by the demultiplexer to select the timer, while the less significant bits are utilized by the timer to select the specific timing circuitry therein corresponding to the desired speed input. Thereafter, the demultiplexer is caused to enable, in addition to the timer, a corresponding one-and-only-one circuit, which permits the next, and only the next, received speed sensor pulse to pass therethrough.

The selected timing circuitry within the timer 236 counts clock pulses for the duration of the input pulse from the corresponding one-and-only-one circuit. When the measurement of the speed pulse is completed an interrupt controller 240 is signaled by either the one-and-only-one circuit $PC_{1-6}$ or the timer 236, via a respective interrupt line $I_{1-6}$. Ordinarily, the interrupt signal would be generated by the one-and-only-one circuit at the end of its output pulse; however, where the speed is very low, and thus the pulse very long (indicating effectively zero speed), the timer may count to its limit before the end of the pulse, in which case it issues an interrupt signal.

The timer 236 is basically a combination of a plurality of separate counters, and it is to be recognized that a variety of different timing mechanisms might be utilized to accomplish the same result. The timer could be constructed, for example, of a plurality of synchronous four-bit up/down binary counters such as those manufactured by National Semiconductor Corporation and distributed with the designation 74LS193, each comprising a device having four such counters therein. The actual number of select lines required from the demultiplexer to enable the timer depends upon the specific components utilized.

The clock pulses for use by the timer 236 originate within clock circuitry of the CPU 220, though their frequency is reduced by a frequency divider 238 so that the clock frequency is neither too low to provide sufficient resolution of the measured speed, nor so high that an unreasonably large timer is necessary. The frequency divider also provides a different lower frequency clock pulse to the A/D converters 230 and 232 in order to maximize analog to digital conversion speed.

Upon receipt of an interrupt signal from the timer 236 or a one-and-only-one circuit $PC_{1-6}$, the interrupt controller 240 signals the CPU 220, via the control bus 222, that an interrupt has occurred. At an appropriate point in the control program the CPU acknowledges the interrupt, via the control bus, which causes the interrupt controller to issue an address corresponding to the selected speed input, which directs the CPU to a location in its memory where a program routine for serving that particular interrupt begins. Thereafter, the CPU executes that routine, addressing the timer 236 and the appropriate timing circuitry therein, and obtaining the speed data via the data bus 226 in a conventional manner, as instructed by that routine. The interrupt controller is a standard component of a type commonly known in the art and may, for example, be a priority interrupt controller manufactured by Intel Corporation and distributed with the designation 8259.

In the subject embodiment, additional inputs are provided to the CPU by I/O ports $P_{1-3}$. The input to $P_1$ is an on/off signal from the keyswitch 106; the input to $P_2$ is an on/off signal from the forward direction switch 127a; and the input to $P_3$ is an on/off signal from the reverse switch 127b.

In order to control the drive system, variable amplitude signals are utilized to govern the displacement of the pump-motor 26, the displacement of the pump-motor 42, the spool position of the valve 98 which determines whether the pump-motor 42 is operating as a pump or as a motor, and the engine throttle 187. The amplitude and sign of the output signals for controlling the foregoing devices within the system are generated in digital form by the CPU and, therefore, must be converted to corresponding analog signals. This is accomplished, in response to appropriate instructions in the control program, by the issuance of a control signal over the control bus 222 and an address over the address bus 224 which causes the demultiplexer 228 to enable one of four digital-to-analog (D/A) converters 242, 244, 246 or 248. At the same time, the digital representation of the output signal corresponding to the enabled D/A converter is placed on the data bus 226 so that it can be read by the enabled D/A converter. Once the data is read the D/A converter remembers it and proceeds to generate the corresponding analog output signal, while the CPU goes on to other tasks in response to the control program.

In the preferred embodiment valves 96, 128 and 148, which control the operation of pump-motor 42 (by controlling hydraulic valve 98), the displacement of pump-motor 42 and the displacement of pump-motor 26 respectively, are of the on/off type; however, the respective devices which they control may assume continuously-variable positions. Consequently, the positions of the latter devices must be monitored and the valves which control them must be modulated in an on/off manner in order to adjust those positions. Similarly, the throttle position is adjusted by a motor 186 operated in an on/off manner. Control of the aforementioned three valves and the throttle motor is accomplished utilizing respective servo-amplifiers 250, 252, 254 and 256 each of which reads an analog signal output from a corresponding D/A converter, compares that signal to the position signal input from its respective device, and modulates the appropriate valve or motor, as the case may be, via outputs $d_{1-4}$ respectively, as is commonly known in the art. A suitable servo-amplifier, for example, is one manufactured by McCormick Servo Controls Incorporated and distributed with the designation M.S.S. 49750-1 Rev. B. This device may be modified to turn on either of two different output signal lines (+,−) as shown in FIG. 16, depending upon the sign of its analog input signal, in order to control two separate solenoids in each of the three-position solenoid valves 96, 128 and 148, and to control the bidirectional operation of throttle motor 186.

Additional on/off output signals are generated by I/O ports $P_{4-15}$, upon the occurrence of appropriate instructions in the control program. These outputs are utilized to actuate various solenoid-operated hydraulic valves in the drive system, as well as the relay 109, and each requires a respective power amplifier $AMP_{1-12}$, having outputs $e_{1-12}$ respectively, in order to provide sufficient power to operate the solenoids which control those valves.

Each of the power amplifiers $AMP_{1-12}$, and the four servo amplifiers 250, 252, 254 and 256, receives its power from the relay assembly 208 (FIG. 4) via signal line EMG. When the emergency mode of operation of the drive system is selected by the operator, the power to these amplifiers is cut off by the relay assembly, thereby preventing the controller 80 from controlling the drive system.

It is to be understood that the foregoing is an essentially functional description of the architecture of the controller 80, that the aforedescribed functions are accomplished by conventional digital logic circuitry, and that a variety of different components might be utilized to accomplish the same functions depending upon the requirements of the particular drive system, component availability, and economic circumstances, without departing from the principles of the present invention. It is also to be understood that the actual control scheme is governed by the flow charts shown in FIGS. 5-14 through the use of a control program stored in and executed by the CPU 220.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In a wheeled vehicle having first and second wheels and an engine, a vehicle drive system comprising:
   (a) energy storage means for collecting and storing energy;
   (b) power transmission means mechanically coupled to said first wheel, but not said second wheel, of said vehicle for applying torque to said first wheel but not said second wheel;
   (c) transmission control means for selectively connecting said power transmission means to said energy storage means for causing said power transmission means to transfer energy between said storage means and said first wheel;
   (d) said power transmission means comprising variable torque application means for controllably applying varying amounts of torque to said first wheel while transferring energy between said storage means and said first wheel;
   (e) wheel speed sensor means for sensing and comparing the respective rotational speeds of said first and second wheels; and
   (f) means connected to said variable torque application means and to said wheel speed sensor means for causing said torque application means to reduce the amount of torque applied to said first wheel automatically in response to a difference between the rotational speeds of said first and second wheels of at least a predetermined minimum magnitude.

2. The drive system of claim 1 wherein said power transmission means is coupled to said first wheel so as to drive said first wheel by applying said torque thereto, and wherein said difference between the rotational speeds of said first and second wheels is an excess of the speed of said first wheel over the speed of said second wheel.

3. The drive system of claim 1 wherein said power transmission means is coupled to said first wheel so as to brake or decelerate said first wheel by applying said torque thereto, and wherein said difference between the rotational speeds of said first and second wheels is an excess of the speed of said second wheel over the speed of said first wheel.

4. A method for operating a wheeled vehicle having first and second wheels and an engine, said method comprising:
   (a) collecting and storing energy in an energy storage device;
   (b) mechanically coupling a power transmission to said first wheel, but not to said second wheel, of said vehicle so as to apply torque to said first wheel through said power transmission;
   (c) selectively connecting said power transmission to said energy storage device for causing said power transmission to transfer energy between said storage device and said first wheel;
   (d) applying varying amounts of torque to said first wheel through said power transmission;
   (e) sensing and comparing the respective rotational speeds of said first and second wheels; and
   (f) causing said power transmission to reduce the amount of torque applied to said first wheel automatically in response to a difference between the rotational speeds of said first and second wheels of at least a predetermined minimum magnitude.

5. The method of claim 4 wherein said power transmission is coupled to said first wheel so as to drive said first wheel by applying said torque thereto, said step (f) comprising causing said power transmission to reduce the amount of torque applied to said first wheel in response to an excess of the speed of said first wheel over the speed of said second wheel of at least said predetermined minimum magnitude.

6. The method of claim 4 wherein said power transmission is coupled to said first wheel so as to brake or decelerate said first wheel by applying said torque thereto, said step (f) comprising causing said power transmission to reduce the amount of torque applied to said first wheel in response to an excess of the speed of said second wheel over the speed of said first wheel of at least said predetermined minimum magnitude.

7. A method for preventing significant slippage and resultant energy loss of a driven wheel of a wheeled vehicle having first and second wheels and an engine, said method comprising:
   (a) collecting and storing energy in an energy storage device;
   (b) mechanically coupling a power transmission to said first wheel, but not to said second wheel, of said vehicle so as to apply torque to said first wheel, but not to said second wheel, through said power transmission;
   (c) selectively connecting said power transmission to said energy storage device for causing said power transmission to transfer energy between said storage device and said first wheel;
   (d) applying varying amounts of torque to said first wheel through said power transmission;
   (e) detecting incipient slippage of said first wheel by sensing and comparing the respective rotational speeds of said first and second wheels; and
   (f) causing said power transmission to reduce the amount of torque applied to said first wheel automatically, in response to a difference between the rotational speeds of said first and second wheels of at least a predetermined minimum magnitude, to an amount of torque at which said difference between said rotational speeds is less than said predetermined minimum magnitude.

8. The method of claim 7 wherein said power transmission is coupled to said first wheel so as to drive said first wheel by applying said torque thereto, said step (f) comprising causing said power transmission to reduce the amount of torque applied to said first wheel in response to an excess of the speed of said first wheel over the speed of said second wheel of at least said predetermined magnitude.

9. The method of claim 7 wherein said power transmission is coupled to said first wheel so as to brake or decelerate said first wheel by applying said torque thereto, said step (f) comprising causing said power transmission to reduce the amount of torque applied to said first wheel in response to an excess of the speed of said second wheel over the speed of said first wheel of at least said predetermined minimum magnitude.

* * * * *

UNITED STATES PATENT AND TRADEMARK OFFICE
CERTIFICATE OF CORRECTION

PATENT NO. : 4,372,414

DATED : February 8, 1983

INVENTOR(S) : Anderson, David H. and Lucas, Eugene F.

It is certified that error appears in the above—identified patent and that said Letters Patent are hereby corrected as shown below:

Col. 6, line 46, Change "(Known" to --Known--.

Col. 8, line 34 Change "rathr" to --rather--.

Col. 22, line 16 Change "80" to --90--.

Col. 23, line 21 Change "systems" to --system--.

Signed and Sealed this

Third Day of May 1983

[SEAL]

Attest:

GERALD J. MOSSINGHOFF

Attesting Officer

Commissioner of Patents and Trademarks